United States Patent [19]

Kawaoka et al.

[11] Patent Number: 5,251,036
[45] Date of Patent: Oct. 5, 1993

[54] HIGH-DEFINITION STILL PICTURE CAMERAS HAVING A SOLID-STATE IMAGING DEVICE WITH PHOTOELECTRIC CONVERSION ELEMENTS DIVIDED INTO FOUR FIELDS

[75] Inventors: Yoshiki Kawaoka; Kazuya Oda; Masahiro Konishi, all of Tokyo, Japan

[73] Assignee: Fuji Photo Film Co., Ltd., Kanagawa, Japan

[21] Appl. No.: 952,667

[22] Filed: Sep. 28, 1992

Related U.S. Application Data

[62] Division of Ser. No. 651,970, Feb. 7, 1991, Pat. No. 5,177,614.

[30] Foreign Application Priority Data

Feb. 7, 1990 [JP] Japan ................................ 2-25934
Feb. 9, 1990 [JP] Japan ................................ 2-28177

[51] Int. Cl.$^5$ ..................... H04N 3/14; H04N 5/335
[52] U.S. Cl. ............................. 358/213.11; 358/224; 358/213.26
[58] Field of Search ................ 358/213.28, 213.26, 358/213.23, 209, 213.11, 213.22, 44

[56] References Cited

U.S. PATENT DOCUMENTS

| | | | |
|---|---|---|---|
| 4,496,995 | 1/1985 | Colles et al. ............... | 360/9.1 |
| 4,541,010 | 9/1985 | Alston ....................... | 358/213.26 |
| 4,651,227 | 3/1987 | Yunoki et al. .............. | 358/310 |
| 4,686,573 | 8/1987 | Murayama et al. ......... | 358/213.22 |
| 4,720,746 | 1/1988 | Moore ........................ | 358/213.28 |
| 4,763,204 | 8/1988 | Kinoshita et al. .......... | 358/335 |
| 4,819,059 | 4/1989 | Pape .......................... | 358/12 |
| 4,825,301 | 4/1989 | Pape et al. ................. | 358/335 |
| 4,876,590 | 10/1989 | Parulski ..................... | 358/44 |
| 4,928,137 | 5/1990 | Kinoshita ................... | 358/213.11 |
| 4,959,724 | 9/1990 | Ueda ......................... | 358/213.29 |
| 4,972,254 | 11/1990 | Endo et al. ................. | 358/213.22 |
| 5,025,319 | 6/1991 | Mutoh et al. ............... | 358/213.19 |
| 5,070,406 | 12/1991 | Kinoshita ................... | 358/213.11 |

OTHER PUBLICATIONS

"A New High-Resolution 11-mm Diagonal Image Sensor for Still-Picture Photography" by J. Hyneck, IEEE Transactions on Electron Devices, vol. 36 No. 11, Nov. 1989, pp. 2466–2474.
European Search Report.

Primary Examiner—Joseph Mancuso
Assistant Examiner—Wendy R. Greening

[57] ABSTRACT

A high definition camera for photographing still pictures using a high resolution charge coupled solid-state imaging device. The imaging device includes a plurality of photoelectric conversion elements arranged in rows and columns, wherein each column is divided into repeating sequences of four photoelectric elements, each element corresponding to a pixel and one of four fields. A plurality of vertical charge transfer paths are formed between each column of the photoelectric elements and a horizontal charge transfer path is connected to a terminal portion of each of the vertical charge transfer paths. The horizontal charge transfer path includes first and second horizontal registers. Pixel signals generated at photoelectric elements corresponding to one of four fields are transferred to transfer elements in a field shift period corresponding to the one field. Thereafter, the signals are transferred toward to the horizontal charge transfer path in accordance with drive signals and are then horizontally transferred by the horizontal charge transfer path at every row to read and store the signals for the one field. The signals of the four fields are stored in respective memory areas of a memory. In an embodiment, signals are read by every frame and the signals of two fields, corresponding to one of the first and second horizontal registers, are supplied to an electronic viewfinder for display. A still image of the displayed image is recorded in accordance with signals of four fields upon actuation of a shutter. In an additional embodiment, both of the horizontal registers are operable to output signals during a high resolution mode and only one of the horizontal registers are operable to output signals during a low resolution mode.

6 Claims, 18 Drawing Sheets

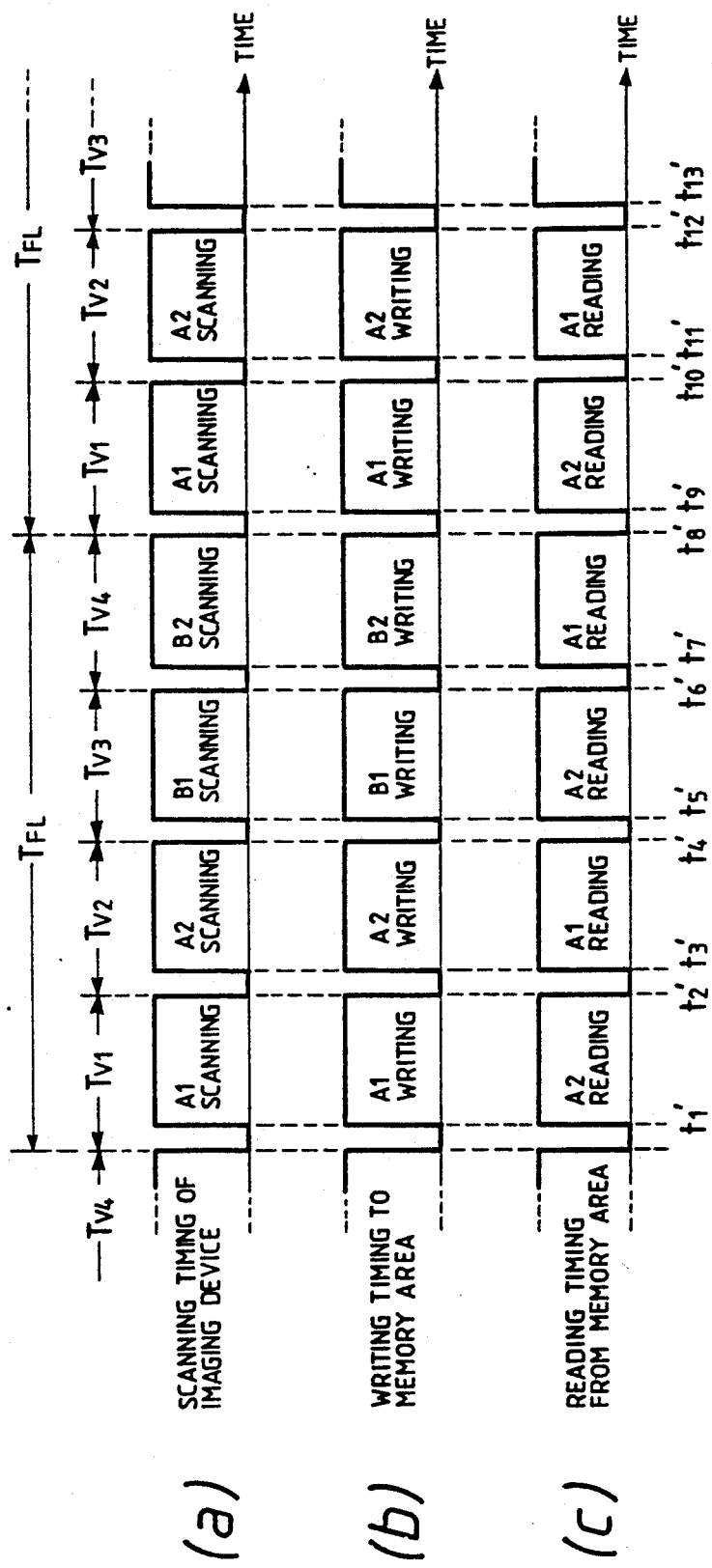

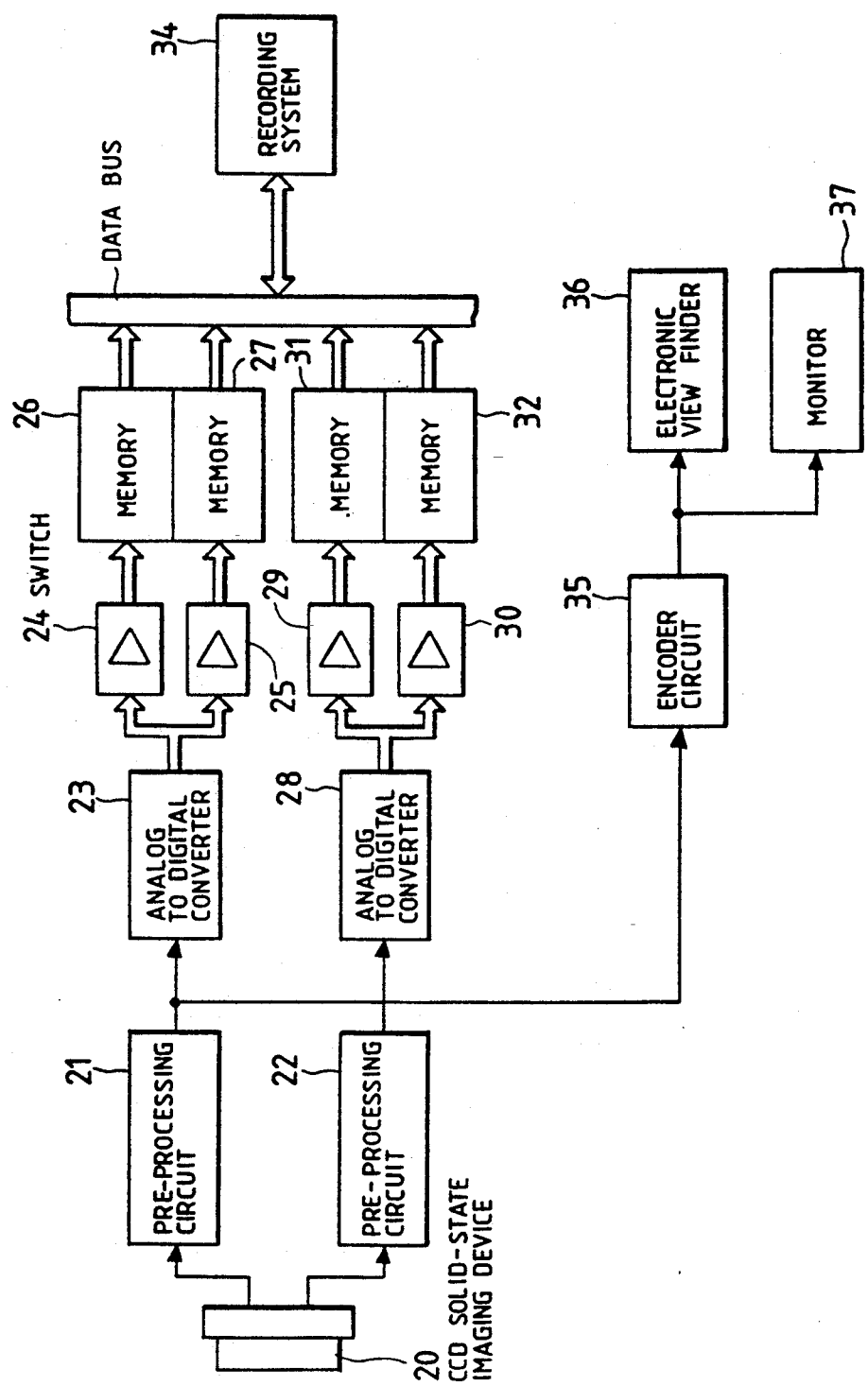

HIGH-DEFINITION STILL PICTURE CAMERAS HAVING A SOLID-STATE IMAGING DEVICE WITH PHOTOELECTRIC CONVERSION ELEMENTS DIVIDED INTO FOUR FIELDS

This application is a divisional of copending application Ser. No. 07/651,970, filed on Feb. 7, 1991, now U.S. Pat. No. 5,177,614. The entire contents of which are hereby incorporated by reference.

BACKGROUND OF THE INVENTION

1. Field of the Invention

This invention relates to high-definition still picture cameras for photographing high-definition still pictures with a high-resolution charge-coupled solid-state imaging device. More particularly, it is directed to a high-definition still picture camera capable of monitoring optical images, such as a motion picture, with an electric view finder.

2. Description of the Background Art

A conventional still picture camera that electronically forms images has about 525 pixels in a vertical direction of its imaging device so as to conform to a total of 525 lines of per frame scanning lines specified by standard television systems such as the NTSC (National Television System Committee) system.

However, to photograph a still picture of such high resolution, as with even higher-definition television systems, its vertical resolution is insufficient. Therefore, the development of a still picture camera capable of forming images with an imaging device having a larger number of pixels is desired.

A still picture camera, as distinguished from a movie camera such as a VTR, requires that pixel signals generated at the respective pixels of its imaging device be scanned in synchronism with every shutter operation. Thus its scanning operation at the time of imaging can be performed at speeds lower than that of a movie camera, and it is this low speed operation that technically permits the application of an imaging device having a large number of pixels in a still picture camera.

However, a still picture camera does require that a picture angle and the like be adjusted while viewing an image formed on the view finder before activating the shutter, and thus motion of the image must be displayed in the view finder. If an electronic view finder is used to monitor the image, the image must be reproduced as a motion picture based on the pixel signals generated as a result of the scanning operation of the imaging device. However, such monitoring, requiring that a high-resolution imaging device scan and read at higher speeds with increasing number of pixels, cannot easily be handled with conventional technology. This has made it difficult to achieve a high-definition still picture camera with an electronic view finder capable of monitoring an image such as a motion picture.

SUMMARY OF THE INVENTION

The invention has been made in view of the above circumstances. Accordingly, an object of the invention is to provide a high-definition still picture camera having an electronic view finder capable of monitoring an image such as a motion picture.

To achieve the above object, an embodiment of the invention is directed to a high-definition still picture camera having an electronic view finder for reproducing an image by reading pixel signals from a charge-coupled solid-state imaging device. The camera is capable of forming the image with high resolution responsive to high-definition television systems and with low resolution responsive to conventional standard television systems.

The charge-coupled solid-state imaging device comprises: a plurality of photoelectric conversion elements arranged in rows and columns in matrix form, each of the photoelectric conversion elements corresponding to a pixel; a plurality of vertical charge transfer paths formed between each column of the photoelectric conversion elements; and a horizontal charge transfer path connected to a terminal portion of each of the vertical charge transfer paths.

In such a high-definition still picture camera, a group of the photoelectric conversion elements arranged in a (4n−3)th row (wherein n is a natural number) are located in a first field; a group of the photoelectric conversion elements arranged in a (4n−2)th row are located in a second field; a group of the photoelectric conversion elements arranged in a (4n−1)th row are located in a third field; and a group of the photoelectric conversion elements arranged in a (4n)th row are located in a fourth field. Each of the vertical charge transfer paths is provided with a first gate electrode (VA1) receiving a drive signal ($\phi_{A1}$) for generating a transfer element for a photoelectric conversion element corresponding to the first field through a transfer gate; a second gate electrode (VB1) receiving a drive signal ($\phi_{B1}$) for generating a transfer element for a photoelectric conversion element corresponding to the second field through a transfer gate; a third gate electrode (VA2) receiving a drive signal ($\phi_{A2}$) for generating a transfer element for a photoelectric conversion element corresponding to the third field through a transfer gate; a fourth gate electrode (VB2) receiving a drive signal ($\phi_{B2}$) for generating a transfer element for a photoelectric conversion element corresponding to the fourth field through a transfer gate; a fifth gate electrode (V2) receiving a fifth drive signal ($\phi_2$) for generating a transfer element and a potential barrier between the first and second gate electrodes (VA1, VB1) and between the third and fourth gate electrodes (VA2, VB2); and a sixth gate electrode (V4) receiving a sixth drive signal ($\phi_4$) for generating a transfer element and a potential barrier between the second and third gate electrodes (VB1, VA2) and between the fourth and first gate electrodes (VB2, VA1). The first through sixth drive signals are controlled so as to read pixel signals corresponding to each field.

Specifically, pixel signals, generated at photoelectric conversion elements corresponding, to one of the first to fourth fields, are transferred to transfer elements in a field shift period corresponding to the field and thereafter transferred toward the horizontal charge transfer path in accordance with the first to sixth drive signals ($\phi_{A1}$, $\phi_{B1}$, $\phi_{A2}$, $\phi_{B2}$, $\phi_2$, $\phi_4$) with the pixel signals being outputted chronologically. The pixel signals are horizontally transferred by the horizontal charge transfer path at every row to read and store the pixel signals corresponding to the field in a first memory area.

Pixel signals, generated at photoelectric conversion elements corresponding to each of the remaining fields, are sequentially field-shifted to transfer elements corresponding to the field and thereafter transferred toward the horizontal charge transfer path in accordance with the first to sixth drive signals ($\phi_{A1}$, $\phi_{B1}$, $\phi_{A2}$, $\phi_{B2}$, $\phi_2$, $\phi_4$) with the pixel signals being outputted chronologically. The pixel signals are horizontally transferred by the horizontal charge transfer path at every row to read and store the pixel signals corresponding to the field in respective second through fourth memory areas. This field based scanning operation is repeated sequentially.

Further, the image is reproduced by the view finder based on pixel signals read from one of the first to fourth memory areas while a memory area other than the one memory area is storing pixel signals.

A further aspect of the invention is directed to a high-definition still picture camera, which in addition to having an electronic view finder for reproducing an image by reading pixel signals from a charge-coupled solid-state imaging device, is also capable of imaging both at high and low resolutions. The charge-coupled solid-state imaging device comprises: a plurality of photoelectric conversion elements arranged in rows and columns in matrix form; a plurality of vertical charge transfer path formed between each column of the photoelectric conversion elements; and a horizontal charge transfer path, consisting of a pair of horizontal charge transfer paths (HCCD1, HCCD2) each of which transfers a different signal charge connected of terminal portions of respective vertical charge transfer paths.

In such a high-definition still picture camera, a group of the photoelectric conversion elements arranged in a (4n−3)th row (wherein n is a natural number) are located in a first field of a first frame region; a group of the photoelectric conversion elements arranged in a (4n−1)th row are located in a second field of the first frame region; a group of the photoelectric conversion elements arranged in a (4n−2)th row are located in a first field of a second frame region; and a group of the photoelectric conversion elements arranged in a (4n)th row are located in a second field of the second frame region.

Each of the vertical charge transfer paths is provided with a first gate electrode (VA1) receiving a drive signal ($\phi_{A1}$) for generating a transfer element for a photoelectric conversion element corresponding to the first field of the first frame region through a transfer gate; a second gate electrode (VB1) receiving a drive signal ($\phi_{B1}$) for generating a transfer element for a photoelectric conversion element corresponding to the first field of the second frame region through a transfer gate; a third gate electrode (VA2) receiving a drive signal ($\phi_{A2}$) for generating a transfer element for a photoelectric conversion element corresponding to the second field of the first frame region through a transfer gate; a fourth gate electrode (VB2) receiving a drive signal ($\phi_{B2}$) for generating a transfer element for a photoelectric conversion element corresponding to the second field of the second frame region through a transfer gate; a fifth gate electrode (V2) receiving a fifth drive signal ($\phi_2$) for generating a transfer element and a potential barrier between the first and second gate electrodes (VA1, VB1) and between the third and fourth gate electrodes (VA2, VB2); and a sixth gate electrode (V4) receiving a sixth drive signal ($\phi_4$) for generating a transfer element and a potential barrier between the second and third gate electrodes (VB1, VA2) and between the fourth and first gate electrodes (VB2, VA1).

Pixel signals, generated at photoelectric conversion elements corresponding to one of the first and second frame regions, are field-shifted to a transfer element corresponding to the frame region and thereafter transferred toward the horizontal charge transfer path in accordance with the first to sixth drive signals ($\phi_{A1}$, $\phi_{B1}$, $\phi_{A2}$, $\phi_{B2}$, $\phi_2$, $\phi_4$). The transferred pixel signals are horizontally transferred by the horizontal charge transfer path while being mixed at every two adjacent rows to read the pixel signals corresponding to the frame region.

Pixel signals, generated at photoelectric conversion elements corresponding to the other frame region, are transferred to a transfer element in a field shift period corresponding to the other frame region and thereafter transferred toward the horizontal charge transfer path in accordance with the first to sixth drive signals ($\phi_{A1}$, $\phi_{B1}$, $\phi_{A2}$, $\phi_{B2}$, $\phi_2$, $\phi_4$). The transferred pixel signals are horizontally transferred by the horizontal charge transfer path while being mixed every two adjacent rows to read the pixel signals corresponding to the frame region, and this frame region-based scanning is repeated alternately.

Further, the image is reproduced by the view finder based on pixel signals read by every frame region.

The high-definition still picture camera as described above can supply low-frequency video signals to the electronic view finder even if the number of pixels is increased. This allows the image to be monitored as a motion picture, thus achieving a high-definition still picture camera with high operational performance Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 17 is a schematic diagram illustrative of the operation of the embodiment shown in FIG. 1; and FIG. 18 is a diagram illustrative of the main portion of a still picture camera according to the embodiment of the present invention as illustrated in FIG. 11.

DETAILED DESCRIPTION OF THE PREFERRED EMBODIMENTS

Figure 1:
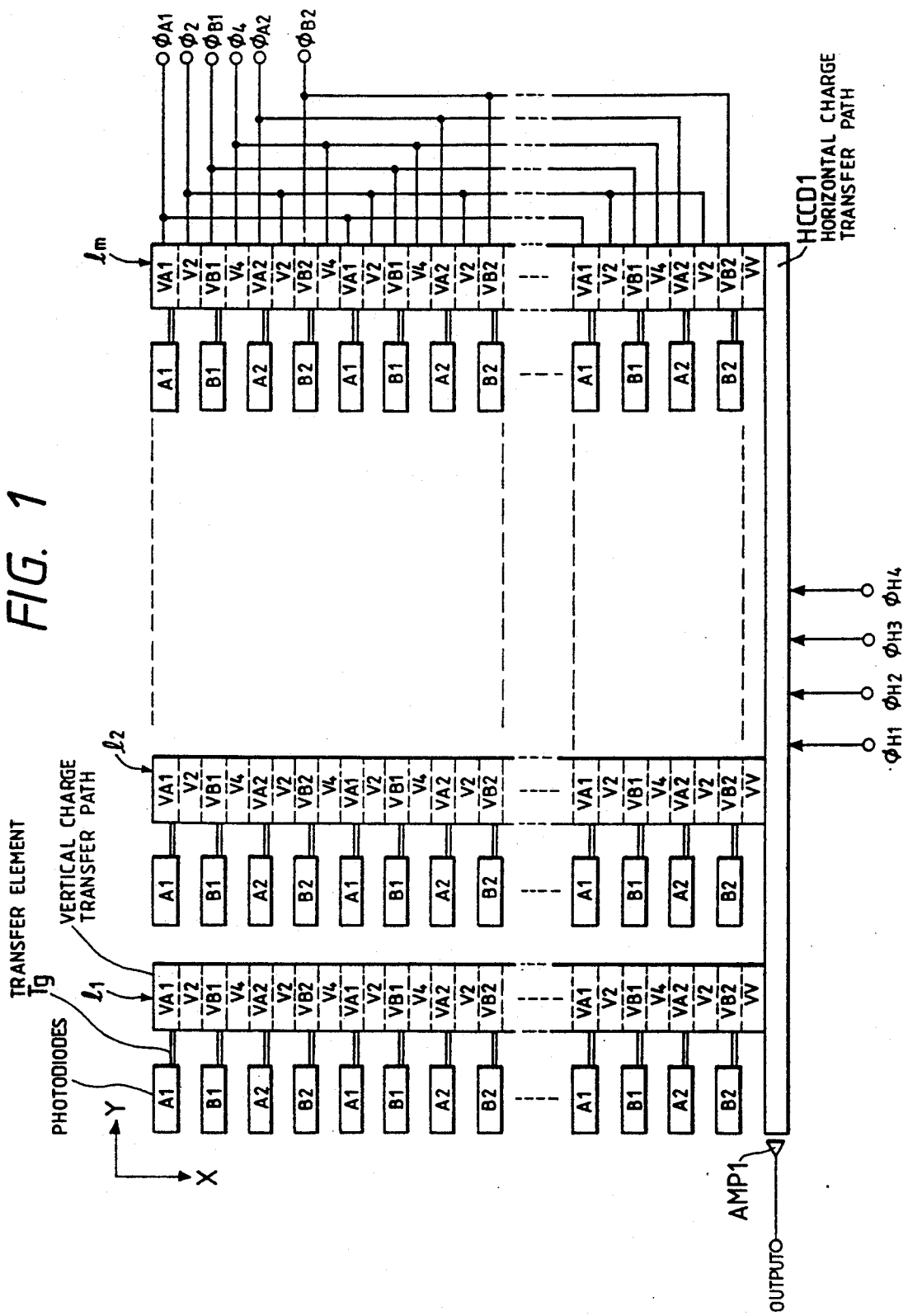
FIG. 1 is a diagram illustrating the construction of a solid-state imaging device according to an embodiment of the present invention.

First, the construction of the solid-state imaging device will be described with reference to FIG. 1. The imaging device is a charge coupled solid-state imaging device prepared on a semiconductor substrate of a predetermined impurity concentration by a semiconductor integrated circuit technology. Its light receiving region has photodiodes A1, B1, A2, B2 arranged to form a matrix consisting of a total of 800,000 pixels with 1000 rows extending in a vertical direction X and 800 columns in a horizontal direction Y. Between each group of the vertically arranged photodiodes is a vertical charge transfer path, amounting to 800 paths 11 to 1m in total. A terminal portion of each of the vertical charge transfer paths 11 to 1m is connected to a horizontal charge transfer path HCCD1, and this horizontal charge transfer path HCCD1 outputs a pixel signal on a point-sequential basis through an output amplifier AMP1 disposed at a terminal thereof.

On the surface of each of the vertical charge transfer paths 11 to 1m the following gate electrodes are formed: a gate electrode VA1 that receives a drive signal $\phi_{A1}$ for the photodiode A1 arranged at a (4n−3)th row in the vertical direction X; a gate electrode VB1 that receives a drive signal $\phi_{B1}$ for the photodiode B1 arranged at a (4n−2)th row in the vertical direction X; a gate electrode VA2 that receives a drive signal $\phi_{A2}$ for the photodiode A2 arranged at a (4n−1)th row in the vertical direction X; and a gate electrode VB2 that receives a drive signal $\phi_{B2}$ for the photodiode B2 arranged at a (4n)th row in the vertical direction. Additionally, a gate electrode V2 which receives a drive signal $\phi_2$ is arranged between the gate electrodes VA1 and VB1 and between the gate electrodes VA2 and VB2. A gate electrode V4 which receives a drive signal $\phi_4$ is arranged between the gate electrodes VB1 and VA2 and between the gate electrodes VB2 and VA1. Each of the gate electrodes in the same row are made of a common polysilicon layer, and signal charges are transferred toward the horizontal charge transfer path HCCD1 by generating both a potential well (hereinafter referred to as "transfer element") having a potential level in accordance with the applied voltage of each of the drive signals $\phi_{A1}$, $\phi_2$, $\phi_{B1}$, $\phi_4$, $\phi_{A2}$, $\phi_{B2}$ and its potential barriers throughout each of the vertical charge transfer paths 11 to 1m.

The portion VV that is located nearest to the horizontal charge transfer path HCCD1 is a gate portion for controlling the connection between the transfer element formed below the gate electrode VB2 located next thereto and the horizontal charge transfer path HCCD1. This gate portion conducts in synchronism with a gate signal (not shown) supplied at a predetermined timing. A transfer gate (designated by Tg in FIG. 1) is formed between each of the photodiodes A1, B1, A2, B2 and the transfer element generated below each of the gate electrodes VA1, VB1, VA2, VB2 corresponding thereto arranged along each vertical charge transfer path. Each transfer gate conducts when a predetermined high voltage is applied to each of the gate electrodes VA1, VB1, VA2, VB2 laminated over such transfer gate. Drive signals $\phi_{A1}$, $\phi_2$, $\phi_{B1}$, $\phi_4$, $\phi_{A2}$, $\phi_{B2}$, and $\phi_{H1}$, $\phi_{H2}$, $\phi_{H3}$, $\phi_{H4}$ necessary for operating the solid-state imaging device 1 are supplied from a synchronization signal generating circuit (not shown). The impurity region of a predetermined concentration formed around these photodiodes A1, B1, A2, B2, the vertical charge transfer paths 11 to 1m, and the horizontal charge transfer path HCCD1 serves as a channel stop.

The operation of such a solid-state imaging device will be described as follows. As described previously, the solid-state imaging device applies not only the six types of drive signals, i.e., six-phase drive signals, $\phi_{A1}$, $\phi_{B1}$, $\phi_{A2}$, $\phi_{B2}$, $\phi_2$, $\phi_4$ to the gate electrodes VA1, VB1, VA2, VB2, V2, V4, respectively, but also the so-called four-phase drive signals $\phi_{H1}$, $\phi_{H2}$, $\phi$H3, $\phi_{H4}$ to the horizontal charge transfer path HCCD1, thereby chronologically reading the pixel signal generated at each photodiode.

In this embodiment, the photodiodes A1, A2 are arranged in the first frame region and the photodiodes B1, B2 are arranged in the second frame region. Further, the photodiode A1 is arranged in the first field of the first frame region and the photodiode A2, in the second field of the first frame region. The photodiode B1 is arranged in the first field of the second frame region and the photodiode B2 in the second field of the second frame region.

The scanning operation will be described in detail with reference to the timing charts shown in FIGS. 2 to 6 and the potential profiles of the vertical charge transfer paths shown in FIGS. 7 to 10. In this embodiment the pixel signals of all the photodiodes are read by sequentially scanning each field as defined above.

Figure 2:
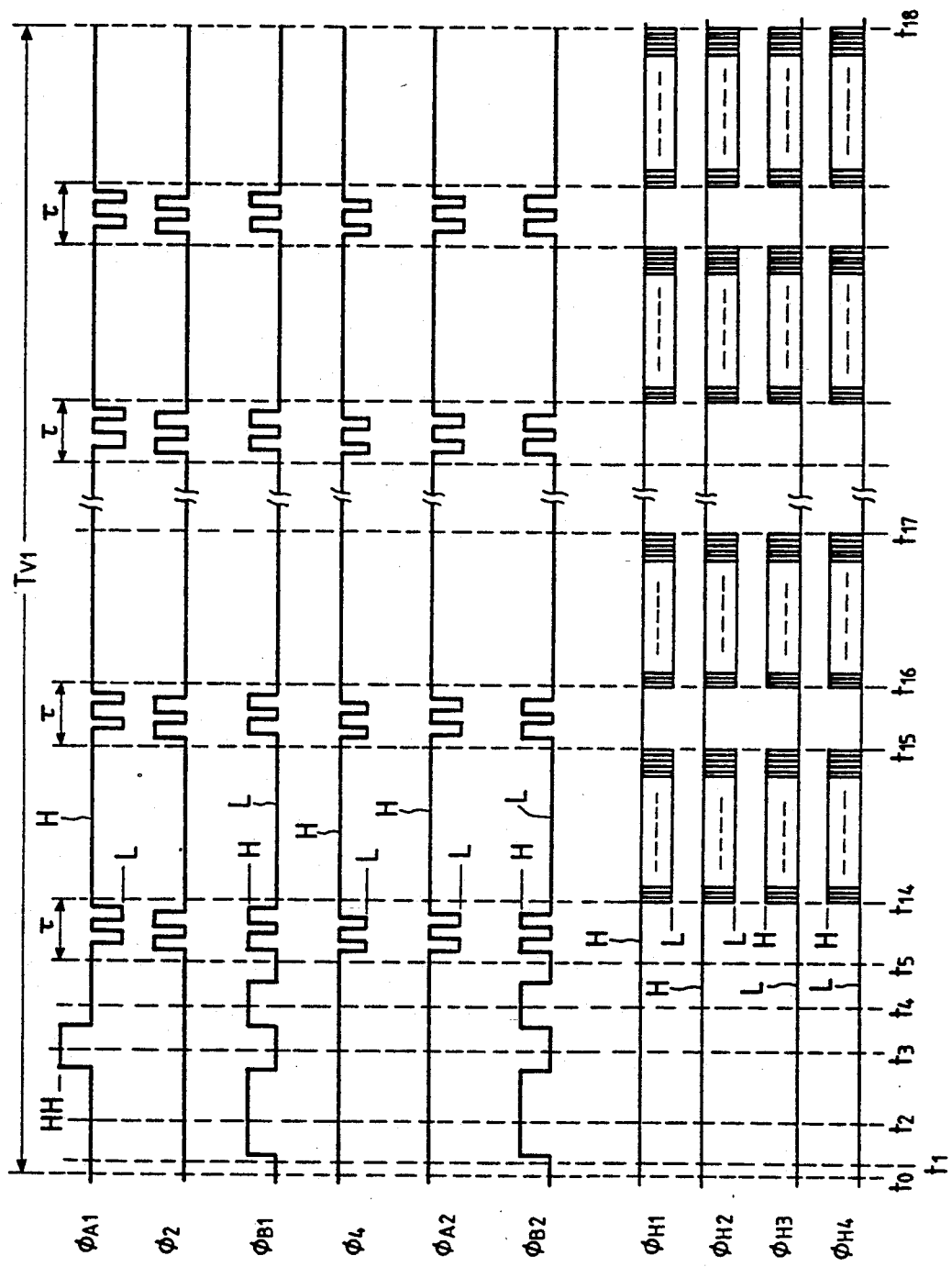
FIGS. 2 to 6 are timing charts illustrative of the operation of the embodiment shown in FIG. 1.

The operation of reading the pixel signal generated at the photodiodes A1 corresponding to the first field of the first frame region will be described with reference to FIG. 2. In FIG. 2, it is assumed that all the photodiodes have been exposed before time $t_0$.

First, the pixel signal $q_{A1}$ of the photodiodes A1 are transferred to predetermined transfer elements of each of the vertical charge transfer paths 11 to 1m through a transfer gate at a period between time $t_1$ and $t_5$, which period comes immediately after the reading operation has been completed by the horizontal charge transfer path HCCD1 at time $t_0$. This period of time is hereinafter referred to as the "field shift period". Specifically, as shown at time $t_1$, the logic level of each drive signal is made to be: $\phi_{A1}=H$, $\phi_{B1}=L$, $\phi_{A2}=H$, $\phi_{B2}=L$, $\phi_2=L$, $\phi_4=H$, thereby generating the transfer elements shown at time $t_1$ in FIG. 7 below the corresponding gate electrodes. Then as shown at time $t_2$, the logic level of each drive signal is made to be: $\phi_{A1}=H$, $\phi_{B1}=H$, $\phi_{A2}=H$, $\phi_{B2}=H$, $\phi_2=L$, $\phi_4=H$, thereby generating the transfer elements shown at time $t_2$ in FIG. 7 below the corresponding gate electrodes. Then as shown at time $t_3$, the logic level of each drive signal is made to be: $\phi_{A1}=HH$, $\phi_{B1}=L$, $\phi_{A2}=H$, $\phi_{=L}$, $\phi_2=L$, $\phi_4=H$, thereby not only causing the transfer gate corresponding to the photodiode A1 to conduct but also generating a deep transfer element below the gate electrode VA1 corresponding to the photodiode A1 as shown at time $t_3$ in FIG. 7. As a result, the pixel signal $q_{A1}$ of the photodiode A1 is transferred to that transfer element. The logic levels HH, H, and L, each designating a predetermined voltage, satisfy the relationship that HH>H>L. The logic level HH is, in particular, a voltage high enough to conduct a transfer gate. Then, as shown at time $t_4$, the logic level of each drive signal is made to be: $\phi_{A1}=H$, $\phi_{B1}=H$, $\phi_{A2}=H$, $\phi_{B2}=H$, $\phi_2=L$, $\phi_4=H$, thereby generating not only a potential barrier below the gate electrode V2 receiving the drive signal $\phi_2$ but also transfer elements below the gate electrodes VB2, V4, VA1 receiving the drive signals $\phi_{B2}$, $\phi_4$, $\phi_{A1}$, respectively, as shown at time $t_4$ in FIG. 7. As a result, the pixel signal $q_{A1}$ is held at these transfer elements. Then, as shown at time $t_5$, the logic level of each drive signal is made to be: $\phi_{A1}=H$, $\phi_{B1}=L$, $\phi_{A2}=H$, $\phi_{B2}=L$, $\phi_2=L$, $\phi_4=H$, thereby generating a potential barrier below the gate electrode VB2 receiving the drive signal $\phi_{B2}$ as shown at time $t_5$ in FIG. 7. As a result, the pixel signal $q_{A1}$ is moved in a transfer direction toward where the horizontal charge transfer path HCCD1 is located.

Figure 6:
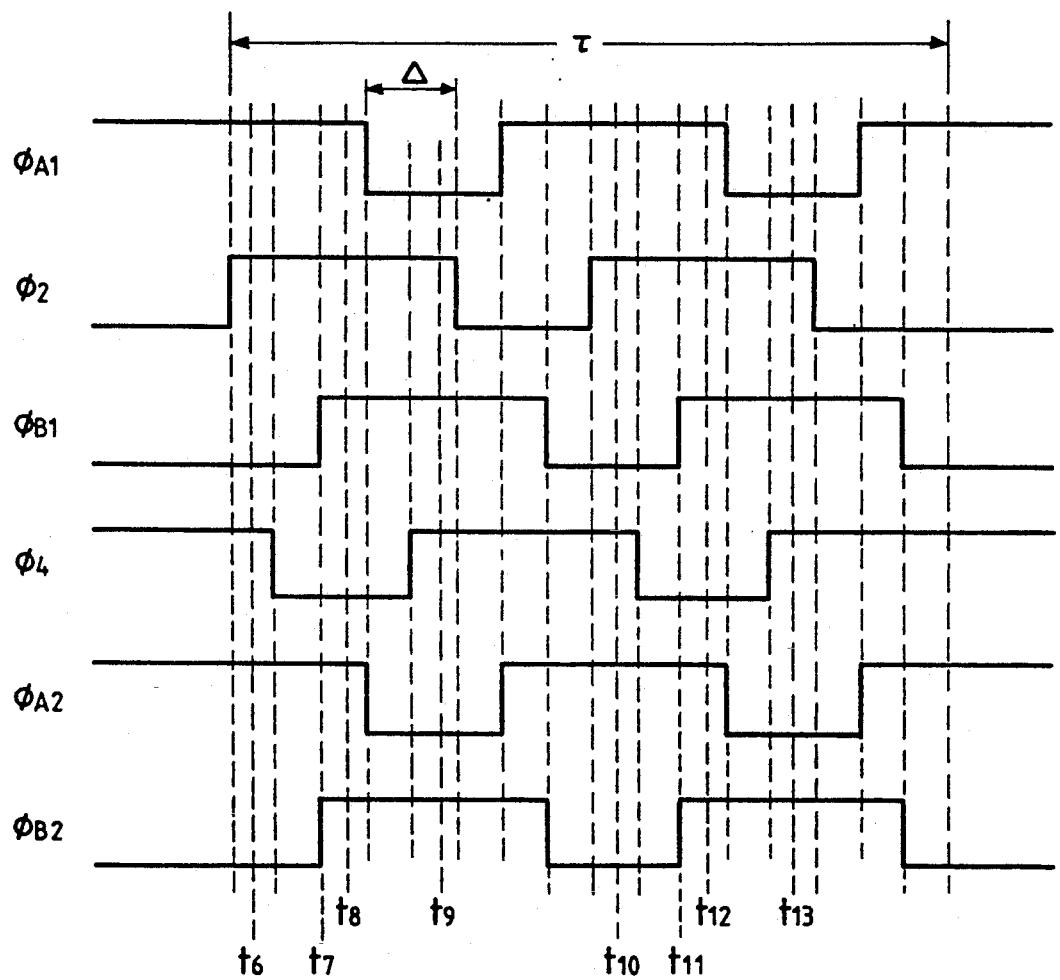

Upon completion of such a transfer operation during times $t_1$ to $t_5$, the operation shown during a period $\tau$ in FIG. 2 will be performed so that the pixel signals $q_{A1}$ equivalent to one horizontal scanning line are transferred in the transfer direction. The timing of each drive signal during this period $\tau$ is set as shown in FIG. 6. Each drive signal is formed of a two-cycle rectangular signal. The drive signal $\phi_2$ lags the drive signal $\phi_{A1}$ changing "H"→"L"→"H"→"L"→"H" by, a predetermined phase $\Delta$. The drive signal $\phi_{B1}$ lags the drive signal $\phi_2$ by a predetermined phase $\Delta$. The drive signal $\phi_4$ lags the drive signal $\phi_{B1}$ by a predetermined phase $\Delta$. The drive signal $\phi_{A2}$ lags the drive signal $\phi_4$ by a predetermined phase $\Delta$ while the drive signal $\phi_{B2}$ lags the drive signal $\phi_{A2}$ by a predetermined phase $\Delta$, with each of these drive signals having an equal waveform.

Figure 7:
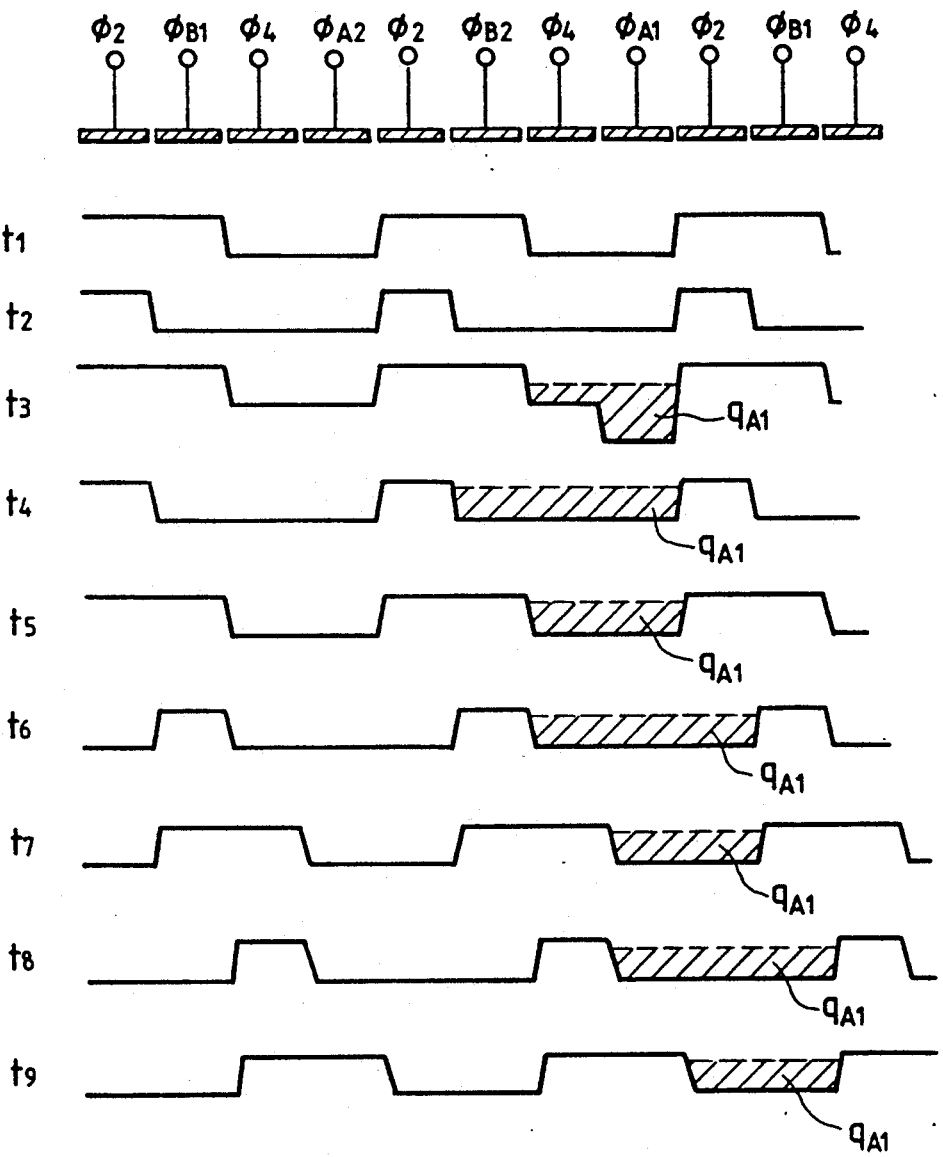
FIGS. 7 to 10 are potential profiles illustrative of the operation of a vertical charge transfer paths corresponding to those shown in FIGS. 2–6.
Figure 8:
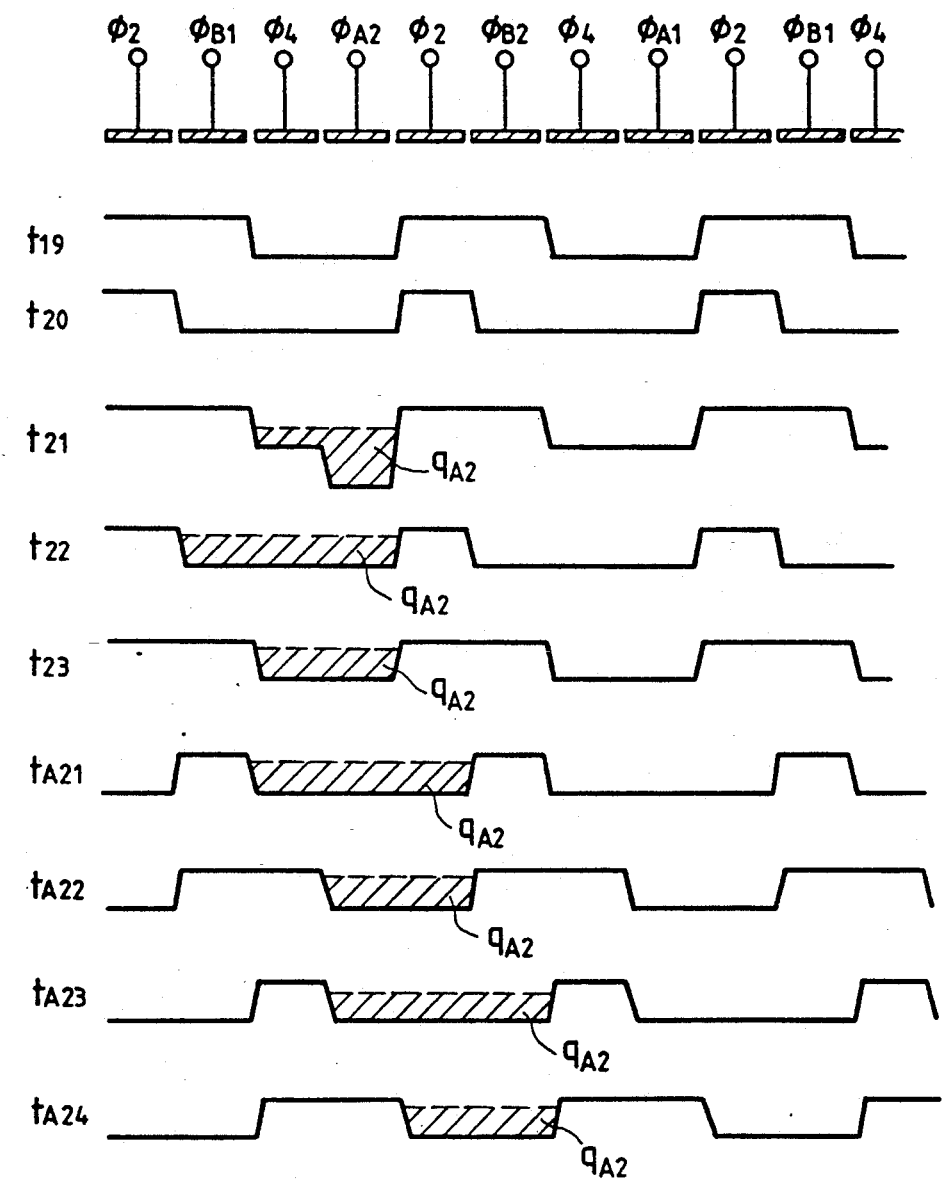
Figure 9:
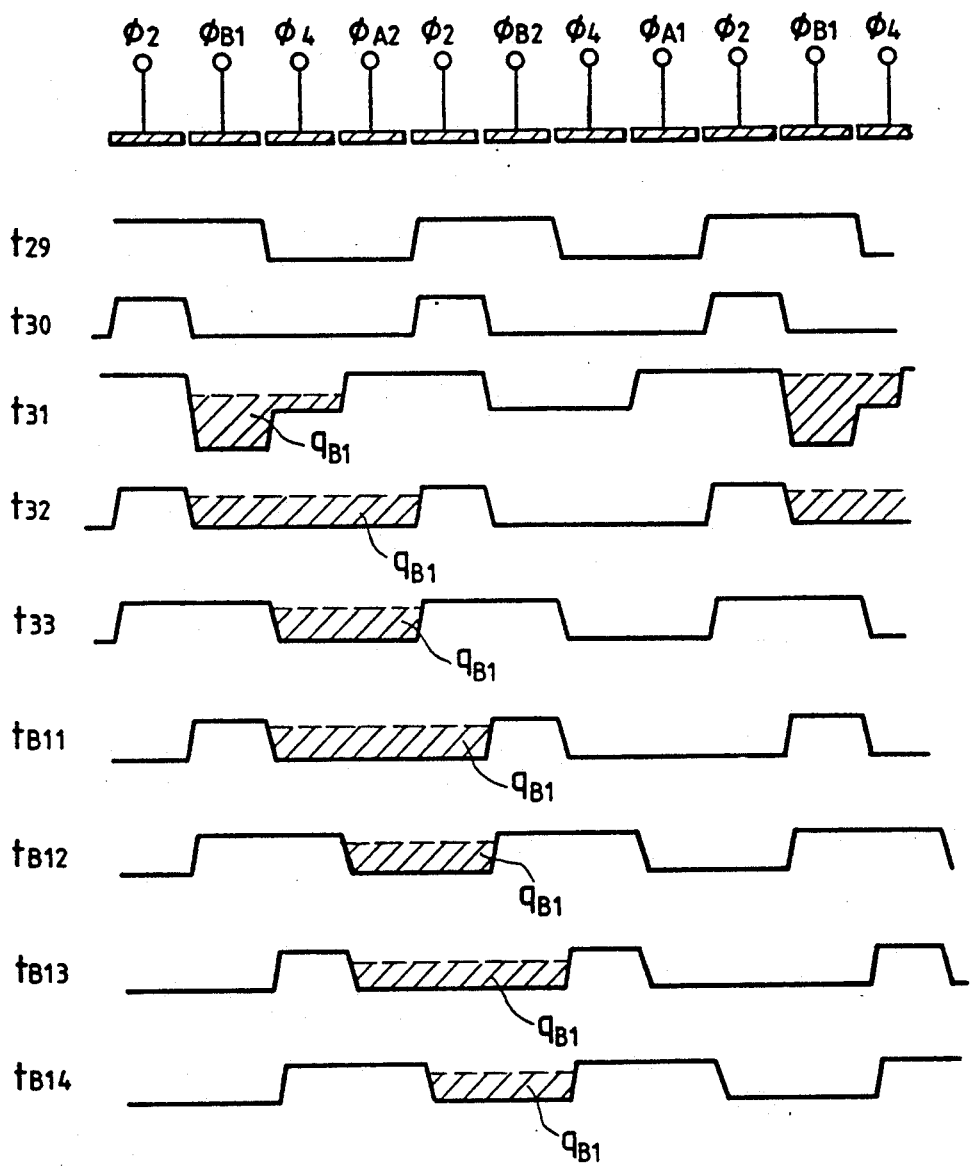
Figure 10:
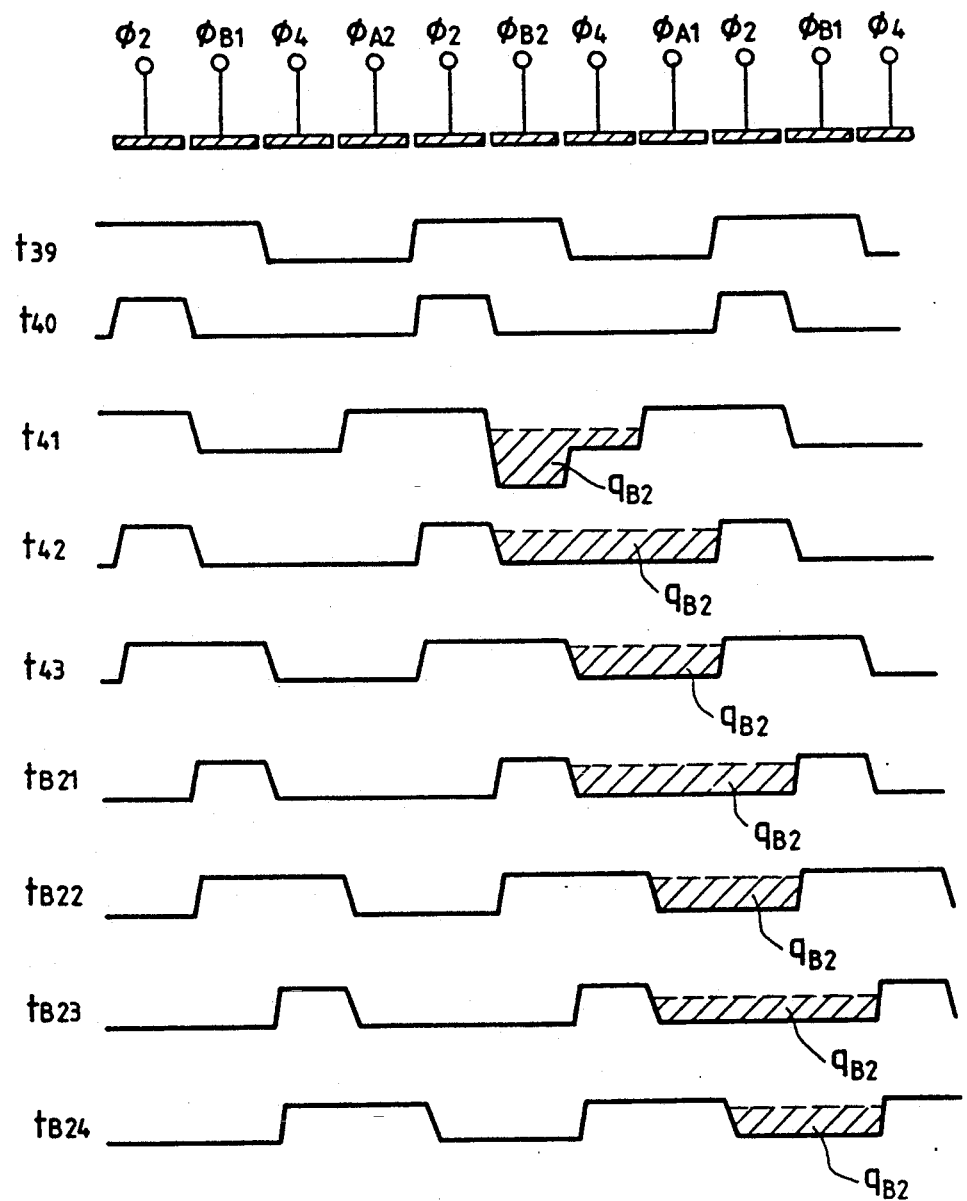

When driving the vertical charge transfer paths 11 to lm by these drive signals having such timings as defined above, the potential profiles such as shown during times $t_6$ to $t_9$ in FIG. 7 are generated in accordance with the waveforms during times $t_6$ to $t_9$ in FIG. 6. This causes the pixel signal $q_{A1}$ at the transfer element generated below the gate electrode VA1 to be transferred to the transfer element below the gate electrode V4. Since the similar potential profiles shown during times $t_6$ to $t_9$ in FIG. 7 are generated in accordance with the waveforms during times $t_{10}$ to $t_{13}$ in FIG. 6, the pixel signal $q_{A1}$ is transferred to the next transfer element below the gate electrode V4. Although not shown in the figure, during times $t_{10}$ to $t_{13}$, the gate portion VV (see FIG. 1) interposed between each of the vertical charge transfer paths 11 to lm and the horizontal charge transfer path HCCD1 is caused to conduct by the application of an "H" level gate signal, thus transferring to the horizontal charge transfer path HCCD1 the pixel signals $q_{A1}$ equivalent to the one horizontal scanning line that is nearest to the horizontal charge transfer path HCCD1.

Then, as shown in FIG. 2, while maintaining the drive signals to be: $\phi_{A1}=H$, $\phi_{B1}=L$, $\phi_{A2}=H$, $\phi_{B2}=L$, $\phi_2=L$, $\phi_4=H$ during times $t_{14}$ to $t_{15}$, the so-called four-phase drive signals $\phi_{H1}$ to $\phi_{H4}$ are applied to the horizontal charge transfer path HCCD1. As a result, the pixel signals $q_{A1}$ equivalent to the first horizontal scanning line is outputted chronologically. These chronologically read signals are then converted into corresponding digital signals by an A/D converter (not shown) and each of the digitized signals is sequentially written into a predetermined address area in a semiconductor memory (not shown).

Upon completion of reading the pixel signals corresponding to the first horizontal scanning line in this way, the operation during times $t_{15}$ to $t_{16}$ will be performed. The operation during times $t_{15}$ to $t_{16}$ is the same as that during $t_5$ to $t_{14}$. The remaining pixel signals $q_{A1}$ are transferred globally via the vertical charge transfer paths 11 to lm, thereby transferring the pixel signals $q_{A1}$ equivalent to a next one horizontal scanning line to the horizontal charge transfer path HCCD1. The same operation as during times $t_{14}$ to $t_{15}$ is performed during times $t_{16}$ to $t_{17}$, thereby reading the pixel signals equivalent to the next horizontal scanning line chronologically. The pixel signals thus read are digitized and then written into the memory.

The foregoing describes the operation of reading the pixel signals for two horizontal scanning lines. The same operation as representatively illustrated during times $t_5$ to $t_{15}$ is successively repeated until all the pixel signals $q_{A1}$ corresponding to the first field of the first frame region are read at time $t_{18}$ in FIG. 2.

Then, the operation of reading the pixel signals $q_{A2}$ generated at the photodiodes A2 corresponding to the second field of the first frame region is started. Specifically, as all the pixel signals $q_{A1}$ have been read at time $t_{18}$ shown in FIG. 3, the scanning operation is started in accordance with the timings of the drive signals shown in FIG. 3.

Figure 3:
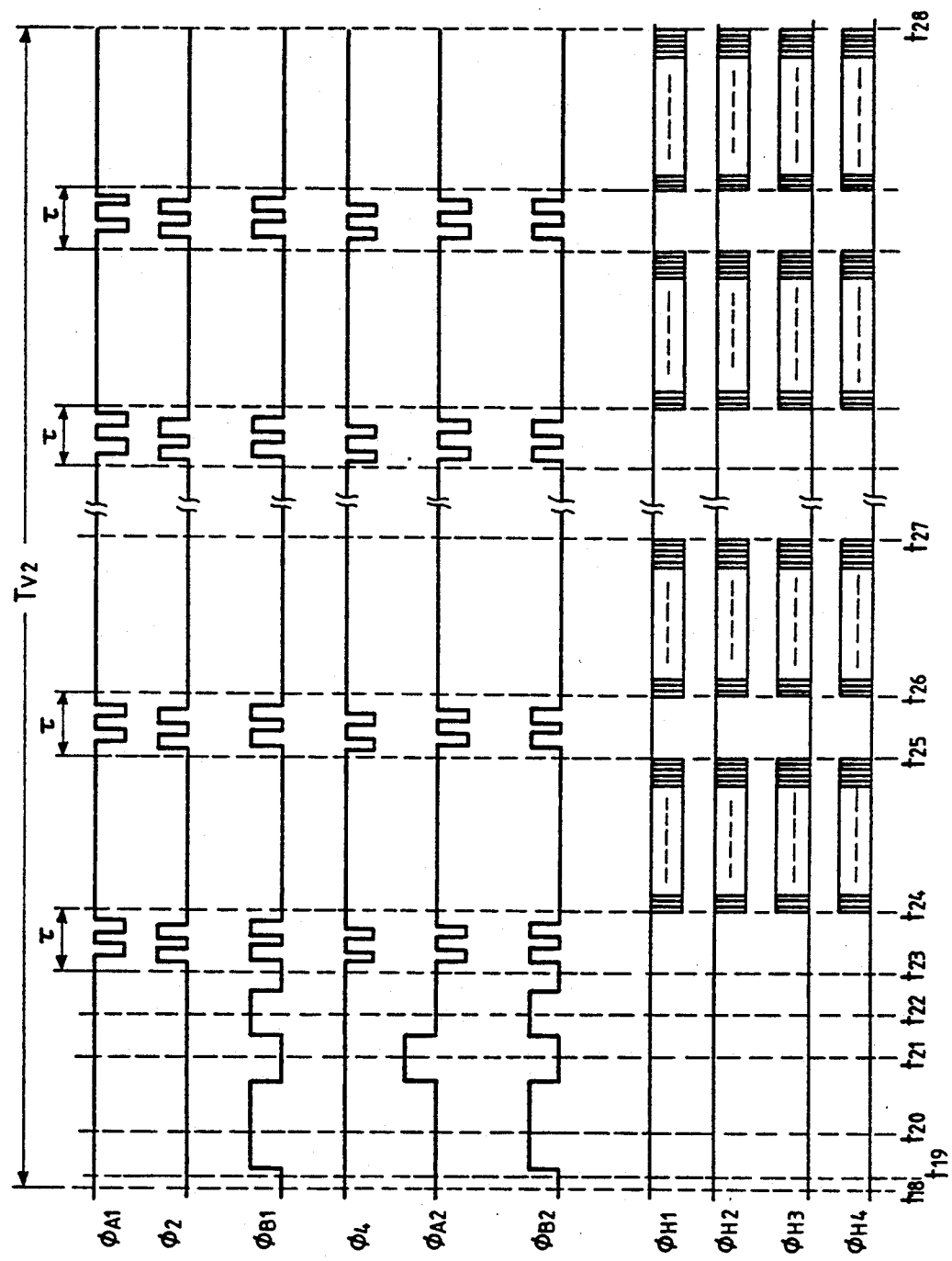

In FIG. 3, the pixel signal $q_{A2}$ of the photodiode A2 is transferred to predetermined transfer elements of the vertical charge transfer paths 11 to lm through a transfer gate during a field shift period immediately after time $t_{18}$ that occurs between time $t_{19}$ and time $t_{23}$. Specifically, as shown at time $t_{19}$, the logic level of each drive signal is made to be: $\phi_{A1}=H$, $\phi_{B1}=L$, $\phi_{A2}=H$, $\phi_{B2}=L$, $\phi_2=L$, $\phi_4=H$, thereby generating the transfer elements shown at time $t_{19}$ in FIG. 8 below the corresponding gate electrodes. Then as shown at time $t_{20}$, the logic level of each drive signal is made to be: $\phi_{A1}=H$, $\phi_{B1}=H$, $\phi_{A2}=H$, $\phi_{B2}=H$, $\phi_2=L$, $\phi_4=H$, thereby generating the transfer elements shown at time $t_{20}$ in FIG. 8 below the corresponding gate electrodes. Then as shown at time $t_{21}$, the logic level of each drive signal is made to be: $\phi_{A1}=H$, $\phi_{B1}=L$, $\phi_{A2}=HH$, $\phi_{B2}=L$, $\phi_2=L$, $\phi_4=H$, thereby not only causing a transfer gate corresponding to the photodiode A2 to conduct but also generating a deep transfer element below the gate electrode VA2 corresponding to the photodiode A2 as shown at time $t_{21}$ in FIG. 8. As a result, the pixel signal $q_{A2}$ of the photodiode A2 is transferred to that transfer element. Then, as shown at time $t_{22}$, the logic level of each drive signal is made to be: $\phi_{A1}=H$, $\phi_{B1}=H$, $\phi_{A2}=H$, $\phi_{B2}=H$, $\phi_2=L$, $\phi_4=H$, thereby generating not only a potential barrier below the gate electrode V2 receiving the drive signal $\phi_2$ but also transfer elements below the gate electrodes VB1, V4, VA2 receiving the drive signals $\phi_{B1}$, $\phi_4$, $\phi_{A2}$, respectively, as shown at time $t_{22}$ in FIG. 8. As a result, the pixel signal $q_{A2}$ is held at these transfer elements. Then, as shown at time $t_{23}$, the logic level of each drive signal is made to be: $\phi_{A1}=H$, $\phi_{B1}=L$, $\phi_{A2}=H$, $\phi_{B2}=L$, $\phi_2=L$, $\phi_4=H$, thereby generating a potential barrier below the gate electrode VB1 receiving the drive signal $\phi_{B1}$ as shown at time $t_{23}$ in FIG. 8. As a result, the pixel signal $q_{A2}$ is moved in the transfer direction.

Upon completion of such a transfer operation during times $t_{19}$ to $t_{23}$, the operation shown at a period $\tau$ (times $t_{23}$ to $t_{24}$) in FIG. 3 will be performed so that the pixel signals $q_{A2}$ equivalent to one horizontal line are transferred in the transfer direction. Specifically, the operation during this period $\tau$ is the same as that shown in FIG. 6. As a result, the pixel signals $q_{A2}$ equivalent to the first horizontal scanning line are transferred via the horizontal charge transfer path HCCD1. The potential profiles during $t_{A21}$ times to $t_{A24}$ correspond to a single cycle (times $t_6$ to $t_9$) of the timing chart shown in FIG. 6.

Then, as shown in FIG. 3, while maintaining the drive signals to be: $\phi_{A1}=H$, $\phi_{B1}=L$, $\phi_{A2}=H$, $\phi_{B2}=L$, $\phi_2=L$, $\phi_4=H$ during times $t_{24}$ to $t_{25}$, the so-called four-phase drive signals $\phi_{H1}$ to $\phi_{H4}$ are applied to the horizontal charge transfer path HCCD1. As a result, the pixel signals $q_{A2}$ equivalent to the first horizontal scanning line are outputted chronologically. These chronologically read signals are then converted into corresponding digital signals by the A/D converter (not shown) and each of the digitized signals is sequentially written into a predetermined address area in the semiconductor memory (not shown).

Then, the same operation during times $t_{23}$ to $t_{25}$ is performed during times $t_{25}$ to $t_{27}$, thereby reading the pixel signals $q_{A2}$ equivalent to a next one horizontal scanning line, and the same operation as representatively described during times $t_{23}$ to $t_{25}$ will be performed to all the remaining pixel signals $q_{A2}$.

Upon completion of reading the pixel signals $q_{A2}$ corresponding to the second field of the first frame region at time $t_{28}$, the operation of reading the pixel signals $q_{B1}$ generated at the photodiodes B1 corresponding to the first field of the second frame region is started.

Figure 4:
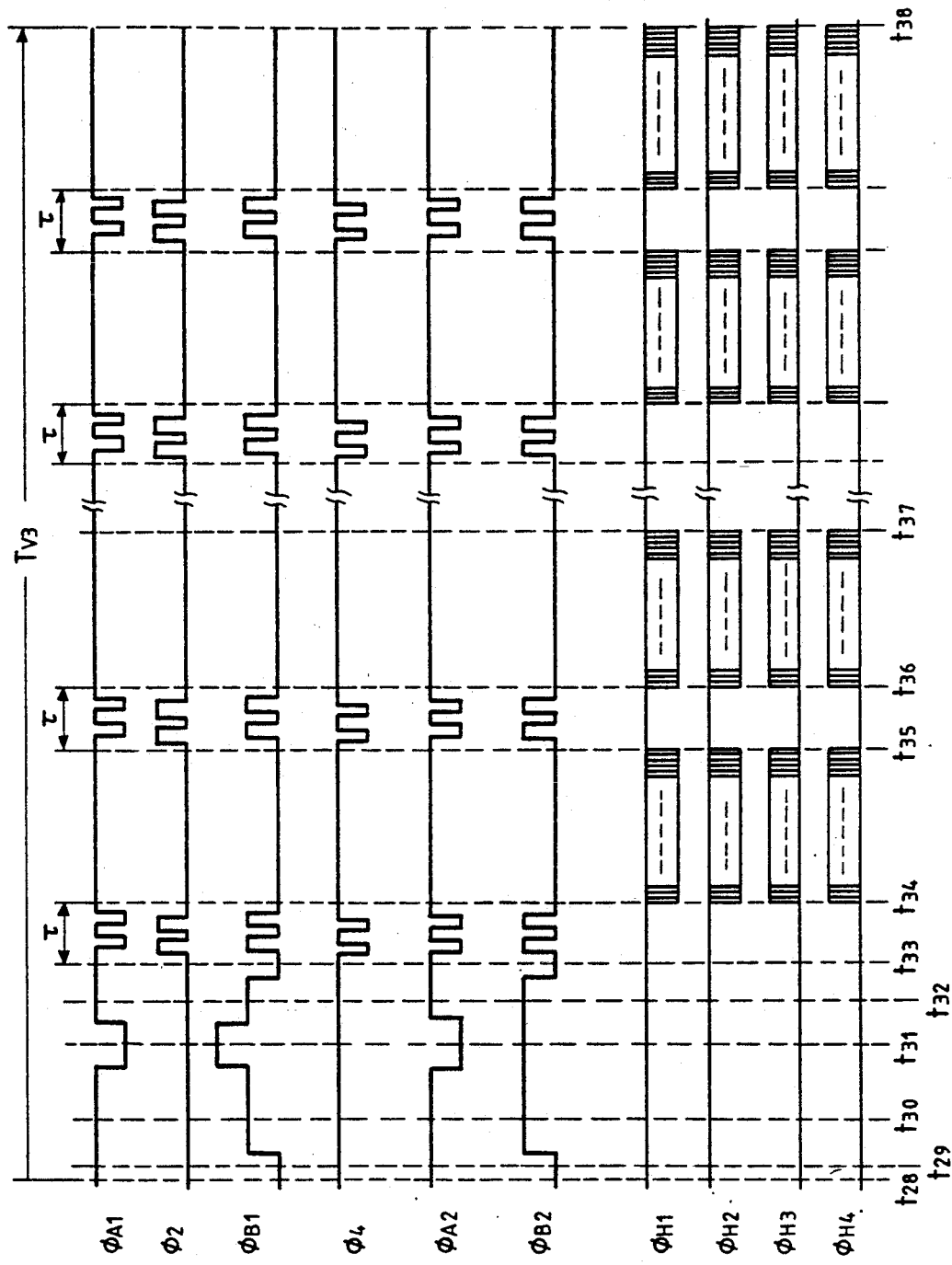

The operation of reading the pixel signals $q_{B1}$ is shown in the timing chart of FIG. 4. As all the pixel signals $q_{A2}$ have been completely read at time $t_{28}$ shown in FIG. 4, the scanning operation is started in accordance with the timings of the drive signals shown in FIG. 4.

In FIG. 4, the pixel signal $q_{B1}$ of the photodiode B1 is transferred to predetermined transfer elements of the vertical charge transfer paths 1l to lm through a transfer gate during a field shift period between time $t_{29}$ immediately after time $t_{28}$ that occurs and time $t_{33}$. Specifically, as shown at time $t_{29}$ the logic level of each drive signal is made to be: $\phi_{A1}=H$, $\phi_{B1}=L$, $\phi_{A2}=H$, $\phi_{B2}=L$, $\phi_2=L$, $\phi_4=H$, thereby generating the transfer elements shown at time $t_{29}$ in FIG. 9 below the corresponding gate electrodes. Then as shown at time $t_{30}$, the logic level of each drive signal is made to be: $\phi_{A1}=H$, $\phi_{B1}=H$, $\phi_{A2}=H$, $\phi_{B2}=H$, $\phi_2=L$, $\phi_4=H$, thereby generating the transfer elements shown at time $t_{30}$ in FIG. 9 below the corresponding gate electrodes. Then as shown at time $t_{31}$, the logic level of each drive signal is made to be: $\phi_{A1}=L$, $\phi_{B1}=HH$, $\phi_{A2}=L$, $\phi_{B2}=H$, $\phi_2=L$, $\phi_4=H$, thereby not only causing a transfer gate corresponding to the photodiode B1 to conduct but also generating a deep transfer element below the gate electrode VB1 corresponding to the photodiode B1 as shown at time $t_{31}$ in FIG. 9. As a result, the pixel signal $q_{B1}$ of the photodiode B1 is transferred to that transfer element. Then, as shown at time $t_{32}$, the logic level of each drive signal is made to be: $\phi_{A1}=H$, $\phi_{B1}=H$, $\phi_{A2}=H$, $\phi_{B2}=H1$, $\phi_2=L$, $\phi_4=H$, thereby generating not only a potential barrier below the gate electrode V2 receiving the drive signal $\phi_2$ but also transfer elements below the gate electrodes VB1, V4, VA2 receiving the drive signals $\phi_{B1}$, $\phi_4$, $\phi_{A2}$, respectively, as shown at time $t_{32}$ in FIG. 9. As a result, the pixel signal $q_{B1}$ is held at these transfer elements. Then, as shown at time $t_{33}$, the logic level of each drive signal is made to be: $\phi_{A1}=H$, $\phi_{B1}=L$, $\phi_{A2}=H$, $\phi_{B2}=L$, $\phi_2=L$, $\phi_4=H$, thereby generating a potential barrier below the gate electrode VB2 receiving the drive signal $\phi_{B2}$ as shown at time $t_{33}$ in FIG. 9. As a result, the pixel signal $q_{B1}$ is moved in the transfer direction.

Upon completion of such a transfer operation during times $t_{29}$ to $t_{33}$, the operation shown at a period $\tau$ (times $t_{33}$ to $t_{34}$) in FIG. 4 will be performed so that the pixel signals $q_{B1}$ equivalent to one horizontal line are transferred in the transfer direction. Specifically, the operation during this period $\tau$ is the same as that shown in FIG. 6. As a result, the pixel signals $q_{B1}$ equivalent to the first horizontal scanning line are transferred via the horizontal charge transfer path HCCD1. The potential profiles during times $t_{B11}$ to $t_{B14}$ correspond to a single cycle (times $t_6$ to $t_9$) in the timing chart shown in FIG. 6.

Then, as shown in FIG. 4, while maintaining the drive signals to be: $\phi_{A1}=H$, $\phi_{B1}=L$, $\phi_{A2}=H$, $\phi_{B2}=L$, $\phi_2=L$, $\phi_4=H$ during times $t_{34}$ to $t_{35}$, the so-called four phase drive signals $\phi_{H1}$ to $\phi_{H4}$ are applied to the horizontal charge transfer path HCCD1. As a result, the pixel signals $q_{B1}$ equivalent to the first horizontal scanning line are outputted chronologically.

The chronologically read signals are converted into corresponding digital signals by the A/D converter (not shown) and each of the digitized signals is sequentially written into a predetermined address area in the semiconductor memory (not shown).

Then, the same operation during times $t_{33}$ to $t_{35}$ is performed during times $t_{35}$ to $t_{37}$, thereby reading the pixel signals $q_{B1}$ equivalent to a next one horizontal scanning line, and the same operation as representatively described during times $t_{33}$ to $t_{35}$ will be performed to all the remaining pixel signals $q_{B1}$.

Upon completion of reading the pixel signals $q_{B1}$ corresponding to the first field of the second frame region at time $t_{38}$, the operation of reading the pixel signals $q_{B2}$ generated at the photodiodes B2 corresponding to the second field of the second frame region is started.

Figure 5:
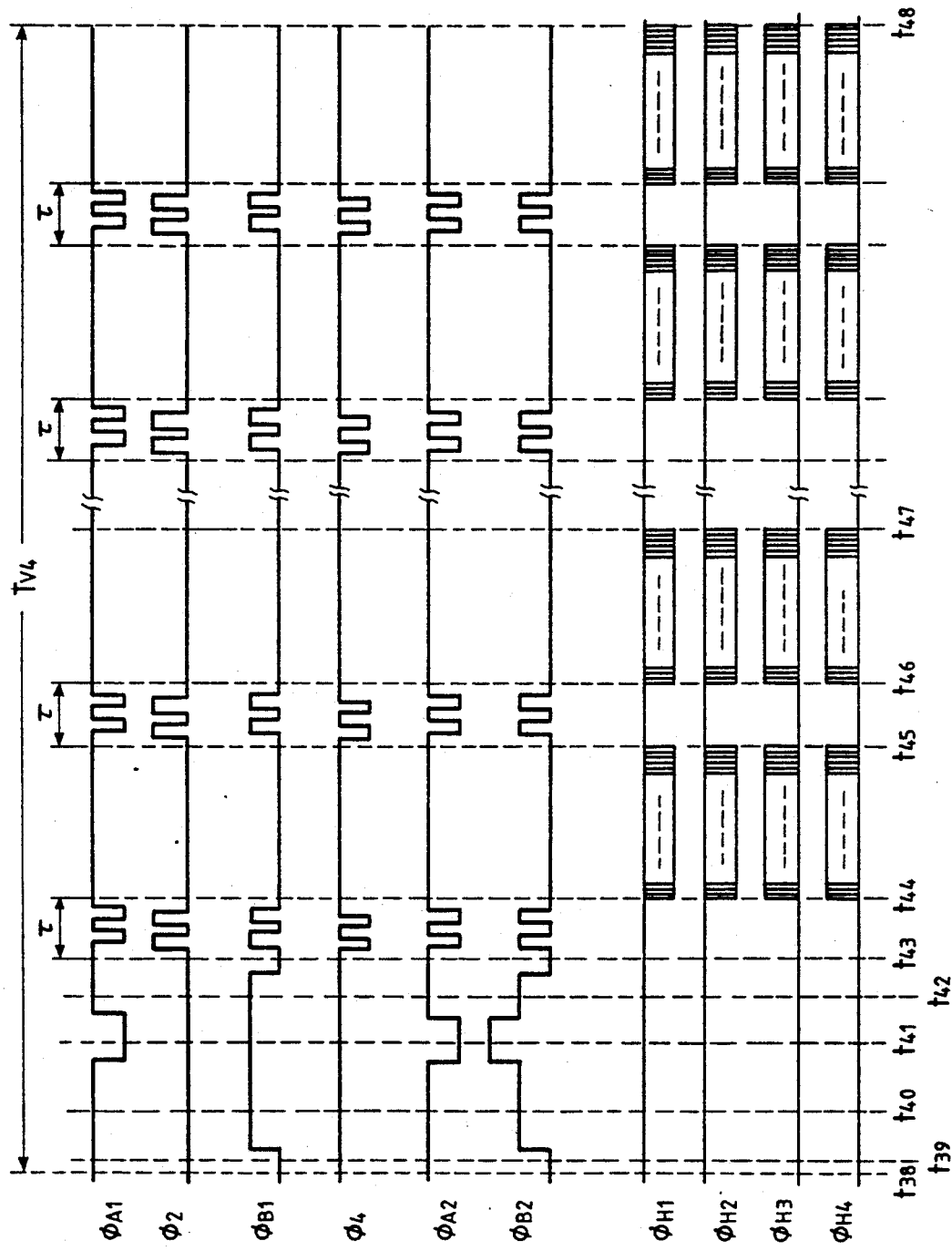

The operation of reading the pixel signals $q_{B2}$ is shown in the timing chart of FIG. 5. As all the pixel signals $q_{B1}$ at time $t_{38}$ shown in FIG. 4 have been completely read, the scanning operation is started in accordance with the timings of the drive signals shown in FIG. 5.

In FIG. 5, the pixel signal $q_{B2}$ of the photodiode B2 is transferred to predetermined transfer elements of the vertical charge transfer paths 1l to lm through a transfer gate during a field shift period immediately after time $t_{38}$ which occurs between time $t_{39}$ and time $t_{43}$. Specifically, as shown at time $t_{39}$ the logic level of each drive signal is made to be: $\phi_{A1}=H$, $\phi_{B1}=L$, $\phi_{A2}=H$, $\phi_{B2}=L$, $\phi_2=L$, $\phi_4=H$, thereby generating the transfer elements shown at time $t_{39}$ in FIG. 10 below the corresponding gate electrodes. Then as shown at time $t_{40}$, the logic level of each drive signal is made to be: $\phi_{A1}=H$, $\phi_{B1}=H$, $\phi_{A2}=H$, $\phi_{B2}=H$, $\phi_2=L$, $\phi_4=H$, thereby generating the transfer elements shown at time $t_{40}$ in FIG. 10 below the corresponding gate electrodes. Then as shown at time $t_{41}$, the logic level of each drive signal is made to be: $\phi_{A1}=L$, $\phi_{B1}=H$, $\phi_{A2}=L$, $\phi_{B2}=HH$, $\phi_2=L$, $\phi_4=H$, thereby not only causing a transfer gate corresponding to the photodiode B2 to conduct but also generating a deep transfer element below the gate electrode VB2 corresponding to the photodiode B2 as shown at time $t_{41}$ in FIG. 10. As a result, the pixel signals $q_{B2}$ of the photodiode B2 is transferred to that transfer element. Then, as shown at time $t_{42}$, the logic level of each drive signal is made to be: $\phi_{A1}=H$, $\phi_{B1}=H$, $\phi_{A2}=H$, $\phi_{B2}=H$, $\phi_2=L$, $\phi_4=H$, thereby generating not only a potential barrier below the gate electrode V2 receiving the drive signals $\phi_2$ but also transfer elements below the lower portions of the gate electrodes VB2, V4, VA1 receiving the drive signals $\phi_{B2}$, $\phi_4$, $\phi_{A1}$, respectively, as shown at time $t_{42}$ in FIG. 10. As a result, the pixel signal $q_{B2}$ is held at these transfer elements. Then, as shown at time $t_{43}$, the logic level of each drive signal is made to be: $\phi_{A1}$=H, $\phi_{B1}$=L, $\phi_{A2}$=H, $\phi_{B2}$=L, $\phi_2$=L, $\phi_4$=H, thereby generating a potential barrier below the gate electrode VB2 receiving the drive signal $\phi_{B2}$ as shown at time $t_{43}$ in FIG. 10. As a result, the pixel signal $q_{B2}$ is moved in the transfer direction.

Upon completion of such a transfer operation during to $t_{39}$ to $t_{43}$, the operation shown at a period $\tau$ (times $t_{43}$ to $t_{44}$) in FIG. 5 will be performed so that the pixel signals $q_{B2}$ equivalent to one horizontal line are transferred in the transfer direction. Specifically, the operation during this period $\tau$ is the same as that shown in FIG. 6. As a result, the pixel signals $q_{B2}$ equivalent to the first horizontal scanning line are transferred via the horizontal charge transfer path HCCD1. The potential profiles during times $t_{B21}$ to $t_{B24}$ correspond to a single cycle (times $t_6$ to $t_9$) of the timing chart shown in FIG. 6.

Then, as shown in FIG. 5, while maintaining the drive signals to be: $\phi_{A1}$=H, $\phi_{B1}$=L, $\phi_{A2}$=H, $\phi_{B2}$=L, $\phi_2$=L, $\phi_4$=H during times $t_{44}$ to $t_{45}$, the so-called four-phase drive signals $\phi_{H1}$ to $\phi_{H4}$ are applied to the horizontal charge transfer path HCCD1. As a result, the pixel signals $q_{B2}$ equivalent to the first horizontal scanning line are outputted chronologically. These chronologically read signals are then converted into corresponding digital signals by the A/D converter (not shown) and each of the digitized signals is sequentially written into a predetermined address area in the semiconductor memory (not shown).

Then, the same operation during times $t_{43}$ to $t_{45}$ is performed during times $t_{45}$ to $t_{47}$, thereby reading the pixel signals $q_{B2}$ equivalent to a next one horizontal scanning line, and the same operation as representatively described during times $t_{43}$ to $t_{45}$ will be performed to all the remaining pixel signals $q_{B2}$.

Accordingly, the first embodiment is so arranged that, while increasing the number of pixels in the vertical direction, the photodiodes, each of which corresponds to a pixel, are divided into four fields and the pixel signals are scanned and read every field sequentially in synchronism with each of the six-phase drive signals. Therefore, high definition pixel signals can be provided. It should be noted that the six-phase drive signals used in the vertical transfer operation permits simplification of the circuits which generate these drive signals. That is, it would be conceivable to introduce an eight-phase drive system if the vertical resolution is almost doubled compared with that of the conventional charge-coupled solid-state imaging devices that adopt the four-phase drive system. However, the eight-phase drive system disadvantageously demands complication and expands the size of the peripheral drive circuits as the number of drive signal types is increased. In contradistinction therewith, the six-phase drive system of this embodiment provides advantages such as simplification of circuit size. This embodiment is suitable for imaging high definition still pictures.

A second embodiment of the invention will now be described. The construction of the embodiment will be described first with reference to FIG. 11. This imaging device is a charge-coupled solid-state imaging device prepared on a semiconductor substrate and is similar to that of FIG. 1 The difference in this embodiment from the first embodiment lies in the arrangement that a terminal of each vertical charge transfer path is connected to a first horizontal charge transfer path HCCD1, that a second horizontal charge transfer path HCCD2 is coupled to the first horizontal charge transfer path HCCD1 through a gate G receiving a gate signal $\phi_{SG}$, and that the pixel signals are read through output amplifiers AMP1 and AMP2 disposed at the output terminals of the horizontal charge transfer paths HCCD1, HCCD2, respectively. Each horizontal charge transfer path HCCD1 or HCCD2 performs its transfer operation in accordance with the four-phase drive signals $\phi_{H1}$, $\phi_{H2}$, $\phi_{H3}$, $\phi_{H4}$. The portion VV that is located nearest to the horizontal charge transfer path HCCD1 is a gate portion for controlling the connection between the transfer element generated below the gate electrode VB2 that is located next thereto and the horizontal charge transfer path HCCD1. This gate portion conducts in synchronism with a gate signal (not shown) supplied at a predetermined timing.

In this embodiment, photodiodes A1, A2 are arranged in the first frame region and the photodiodes B1, B2 are arranged in the second frame region. Furthermore, photodiode A1 is arranged in the first field of the first frame region and photodiode A2 in the second field of the first frame region. Photodiode B1 is arranged in the first field of the second frame region and photodiode B2 in the second field of the second frame region.

The scanning operation of the solid-state imaging device thus arranged will be described now with reference to the timing charts shown in FIGS. 12 to 14 and the potential profiles of a vertical charge transfer paths shown in FIG. 15.

This second embodiment is so arranged that pixel signals generated at the photodiodes A1, B1 corresponding to the first fields of the first and second frame regions, respectively, are simultaneously read during a reading period referred to as the "A-field scanning period", and that pixel signals generated at the photodiodes A2, B2 corresponding to the second fields of the first and second frame regions, respectively, are simultaneously read during a reading period referred to as the "B-field scanning period", thereby scanning the pixel signals equivalent to all the pixels.

First, the operation during the A-field scanning period will be described with reference to FIG. 12. In FIG. 12, it is assumed that all the photodiodes has been exposed before time $T_0$.

The pixel signals of the photodiodes A1, B1 are transferred to predetermined transfer elements of each of the vertical charge transfer paths $l_1$ to $l_m$ through a transfer gate during a period between times $T_1$ and $T_6$ which occurs immediately after the reading operation has been completed by the horizontal charge transfer paths HCCD1 and HCCD2 at time $T_0$, such time period hereinafter referred to as a "field shift period". That is, as shown at time $T_1$, the logic level of each drive signal is made to be: $\phi_{A1}$=H, $\phi_{B1}$=H, $\phi_{A2}$=H, $\phi_{B2}$=H, $\phi_2$=L, $\phi_4$=H, thereby generating the transfer elements shown at time $T_1$ in FIG. 15 generated below the corresponding gate electrodes. Then as shown at time $T_2$, the logic level of each drive signal is made to be: $\phi_{A1}$=L, $\phi_{B1}$=HH, $\phi_{A2}$=L, $\phi_{B2}$=H, $\phi_2$=L, $\phi_4$=H, thereby not only causing a transfer gate corresponding to the photodiode B1 to conduct, but also generating a deep transfer element below the gate electrode VB1 corresponding to the photodiode B1 as shown at time $T_2$ in FIG. 15 As a result, the pixel signal $q_{B1}$ of the photodiode B1 is transferred to that transfer element. The logic levels HH, H, and L, each designating a predetermined voltage, satisfy the relationship that HH>H>L. The logic level HH is, in particular, a voltage high enough to conduct a transfer gate.

Then, as shown at time $T_3$, the logic level of each drive signal is made to be: $\phi_{A1}$=H, $\phi_{B1}$=H, $\phi_{A2}$=H, $\phi_{B2}$=H, $\phi_2$=L, $\phi_4$=H, thereby generating not only a potential barrier below the gate electrode V2 receiving the drive signal $\phi_2$ but also transfer elements below the gate electrodes VB1, V4, VA2 receiving the drive signals $\phi_{B1}$, $\phi_4$, $\phi_{A2}$, respectively, as shown at time $T_3$ in FIG. 15. As a result, the pixel signal $q_{B1}$ is held at these transfer elements.

Then, as shown at time $T_4$, the logic level of each drive signal is made to be: $\phi_{A1}$=HH, $\phi_{B1}$=L, $\phi_{A2}$=H, $\phi_{B2}$=L, $\phi_2$=L, $\phi_4$=H, thereby not only causing a transfer gate corresponding to the photodiode B1 to conduct but also generating a deep transfer element below the gate electrode VA1 corresponding to the photodiode A1 as shown at time $T_4$ in FIG. 15. As a result, the pixel signal $q_{A1}$ of the photodiode A1 is transferred to that transfer element.

Then, as shown at time $T_5$, the logic level of each drive signal is made to be: $\phi_{A1}$=H, $\phi_{B1}$=H, $\phi_{A2}$=H, $\phi_{B2}$=H, $\phi_2$=L, $\phi_4$=H, thereby generating not only a potential barrier below each gate electrode V2 receiving the drive signal $\phi_2$ but also transfer elements below the gate electrodes VB2, V4, VA1 to hold the pixel signal $q_{A1}$ of the photodiode A1 and the gate electrodes VB1, V4, VA2 to hold the pixel signal $q_{B1}$ of the photodiode B1 as shown at time $T_5$ in FIG. 15. Further, as shown at time $T_6$, the logic level of each drive signal is made to be: $\phi_{A1}$=H, $\phi_{B1}$=L, $\phi_{A2}$=H, $\phi_{B2}$=L, $\phi_2$=L, $\phi_4$=H, thereby generating not only potential barriers below the gate electrode V2, VB1, VB2 but also transfer elements below the gate electrodes V4, VA1 to hold the pixel signal $q_{A1}$ of the photodiode A1 and the gate electrodes V4, VA2 to hold the pixel signal $q_{B1}$ of the photodiode B1 as shown at time $T_6$ in FIG. 15.

Figure 12:
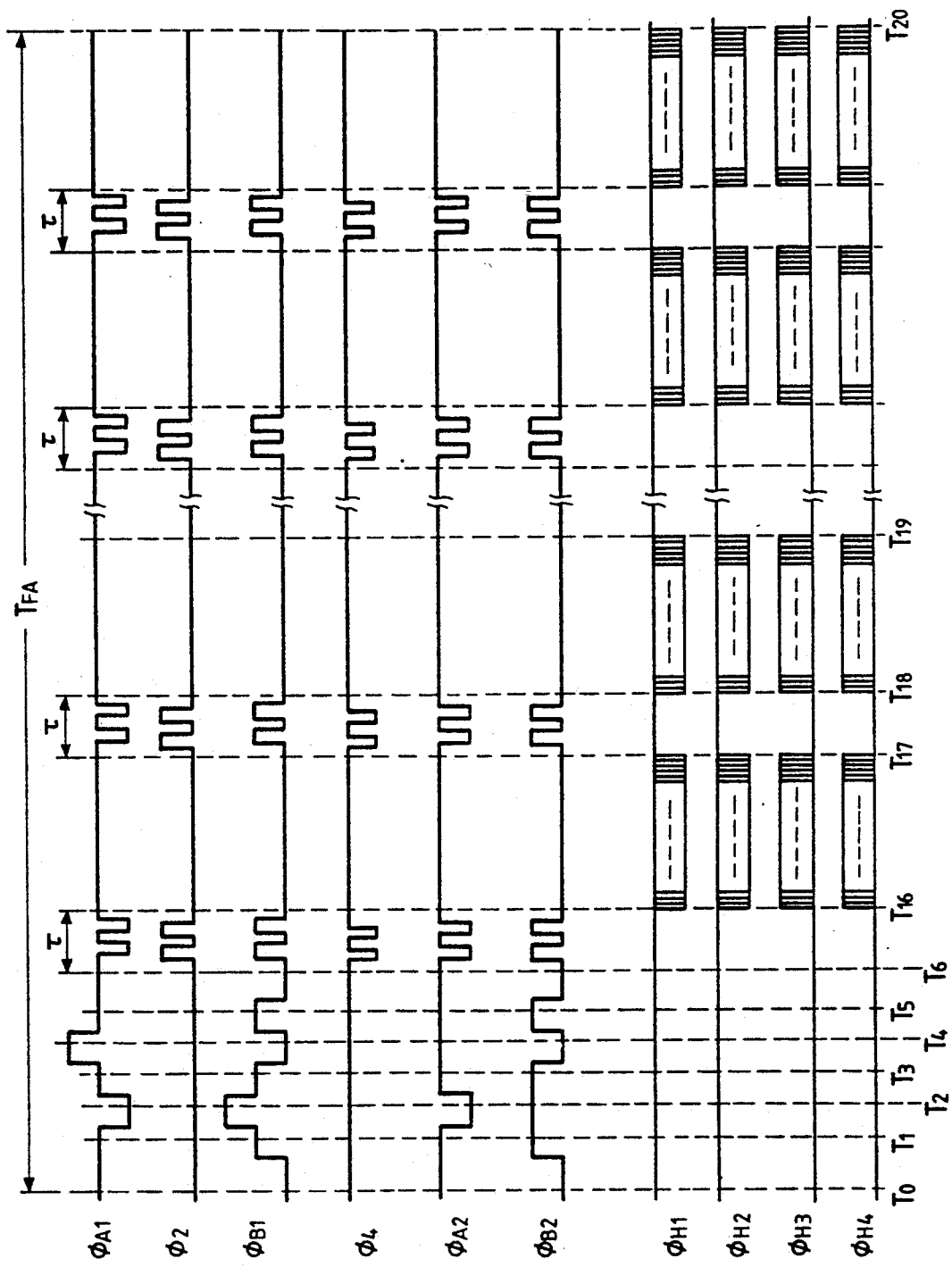
FIGS. 12 to 14 are timing charts illustrative of the operation of the embodiment shown in FIG. 11.

Upon completion of the transfer operation during times $T_1$ to $T_6$, the operation shown at a period $\tau$ in FIG. 12 will be performed so that the pixel signals $q_{A1}$ and the pixel signals $q_{B1}$, each equivalent to one horizontal scanning line, are transferred to the first and second horizontal charge transfer paths HCCD1 and HCCD2, respectively. The timing of each of the drive signals during this period $\tau$ is set as shown in FIG. 14. Each drive signal is formed of a two-cycle rectangular signal. The drive signal $\phi_2$ lags the drive signal $\phi_{A1}$ changing "H"→"L"→"H"→"L"→"H" by a predetermined phase $\Delta$. The drive signal $\phi_{B1}$ lags the drive signal $\phi_2$ by a predetermined phase $\Delta$. The drive signal $\phi_4$ lags the drive signal $\phi_{B1}$ by a predetermined phase $\Delta$ while the drive signal $\phi_{A2}$ lags the drive signal $\phi_4$ by a predetermined phase $\Delta$; and the drive signal $\phi_{B2}$ lags the drive signal $\phi_{A2}$ by a predetermined phase $\Delta$, with each of these drive signals having an equal waveform.

Figure 14:
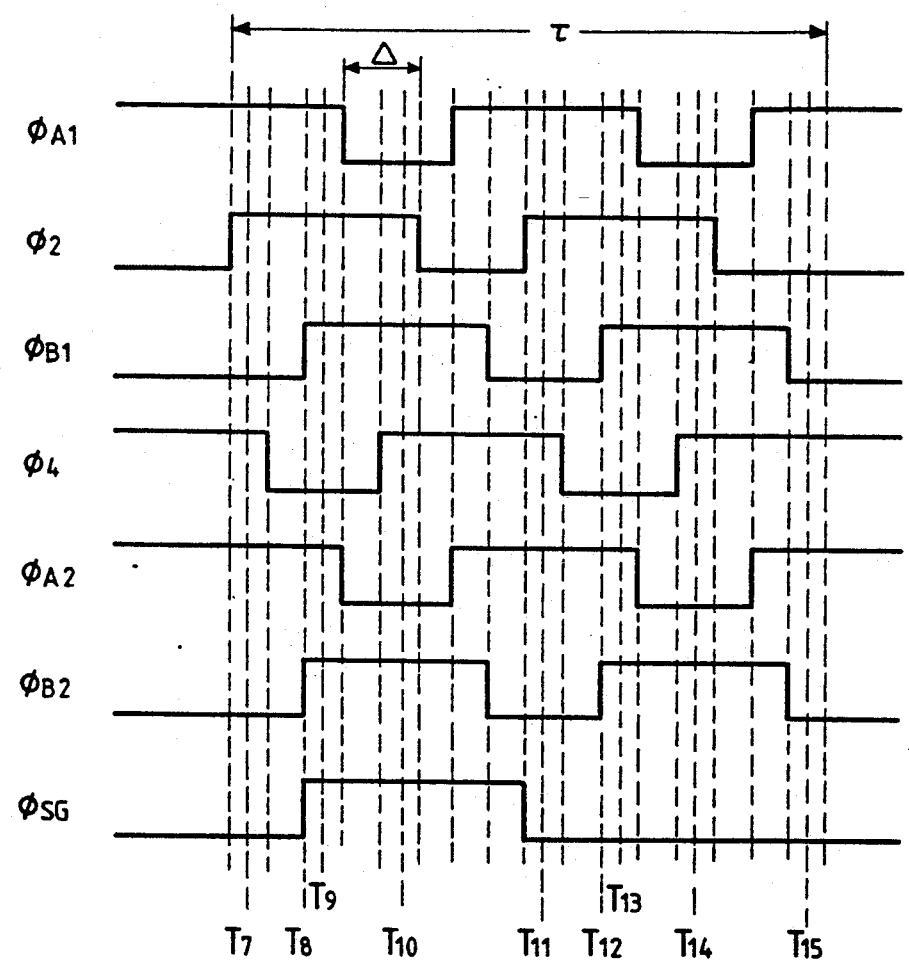
Figure 15:
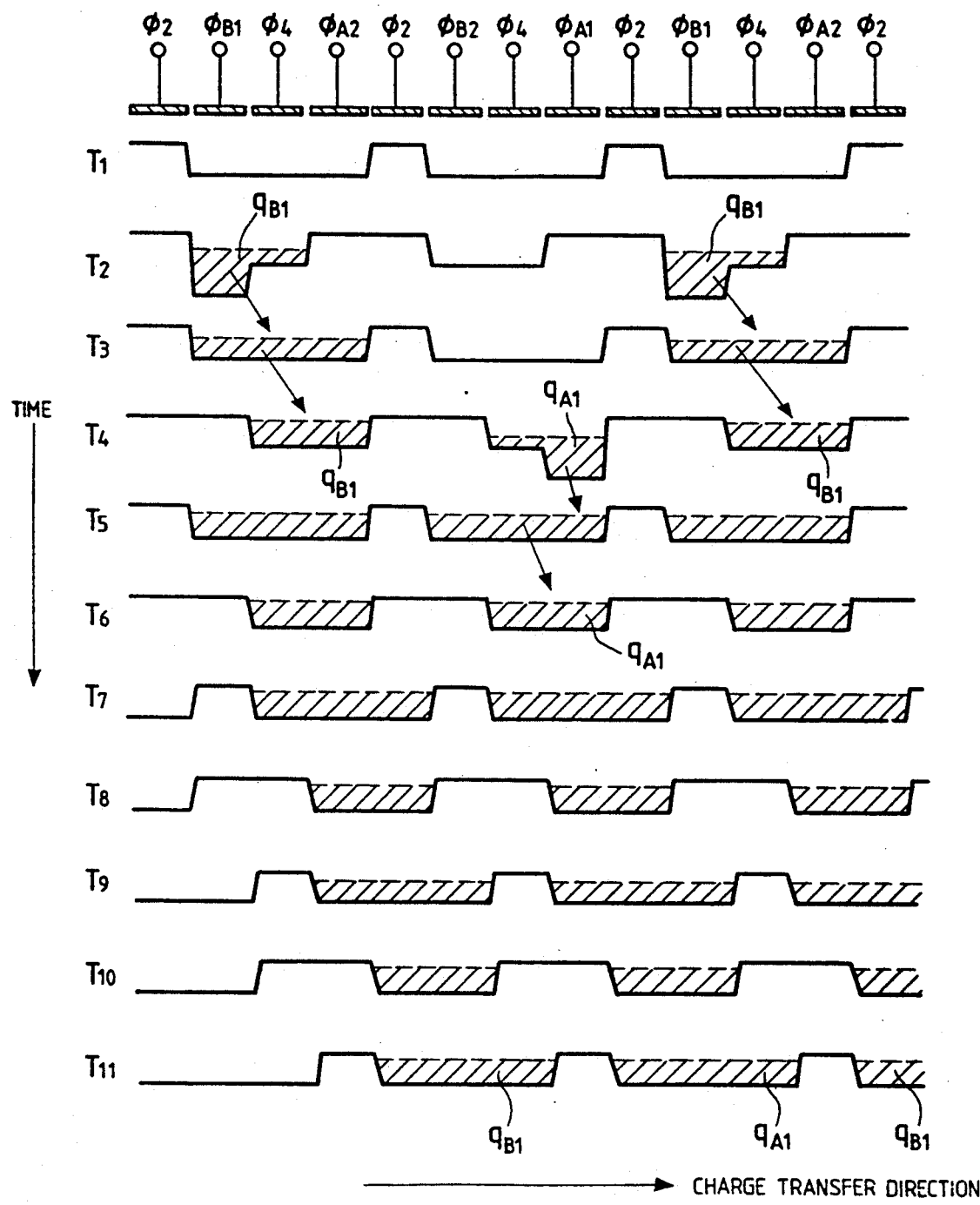
FIGS. 15 is a potential profile illustrative of the operation of a vertical charge transfer paths corresponding to those shown in FIGS. 12 to 14.

When driving the vertical charge transfer paths 11 to 1m by these drive signals having such timings as defined above, the potential profiles shown during times $T_7$ to $T_{11}$ in FIG. 15 are in accordance with the waveforms during times $T_7$ to $T_{11}$ in FIG. 14. This causes the pixel signal $q_{B1}$ nearest to the horizontal charge transfer path HCCD1 to be transferred to the horizontal charge transfer path HCCD1. Further, as shown in FIG. 14, the gate signal $\phi_{SG}$ is first inverted from "L" to "H" in synchronism with the initial rise of the drive signal $\phi_{B2}$, and then inverted from "H" to "L" in synchronism with the second rise of the drive signal $\phi_2$, causing the gate G to conduct. As a result, the pixel signal $q_{B1}$ transferred to the first horizontal charge transfer path HCCD1 is transferred to the second horizontal charge transfer path HHCD2 and held therein.

During the time $\tau$, the same operation as during times $T_7$ to $T_{11}$ will be performed during successive times $T_{11}$ to $T_{15}$. Since the gate signal $\phi_{SG}$ remains at the "L" level during times $T_{11}$ to $T_{15}$, the pixel signal $q_{A1}$ is transferred to the first horizontal charge transfer path HCCD1. The operation during times $T_{11}$ to $T_{15}$ is performed in accordance with the potential profiles similar to those during times $T_7$ to $T_{11}$ shown in FIG. 15.

Then, while maintaining the drive signals to be: $\phi_{A1}$=H, $\phi_{B1}$=L, $\phi_{A2}$=H, $\phi_{B2}$=L, $\phi_2$=L, $\phi_4$=H, the so-called four-phase drive signals $\phi_{H1}$ to $\phi_{H4}$ are supplied to the horizontal charge transfer paths HCCD1, HCCD2 during times $T_{16}$ to $T_{17}$ shown in FIG. 12. As a result, the pixel signals $q_{A1}$, $q_{B1}$, equivalent to the first one horizontal scanning line each, transferred to the first and second horizontal charge transfer paths HCCD1, HCCD2 are chronologically outputted.

Upon completion of reading the pixel signals $q_{A1}$, $q_{B1}$ of the respective first horizontal scanning lines in this way, the operation during times $T_{18}$ to $T_{19}$ will be performed. The operation during times $T_{18}$ to $T_{19}$ is the same as that during time $T_6$ to $T_{16}$. The remaining pixel signals $q_{A1}$ are globally transferred via the vertical charge transfer paths 11 to 1m. As a result, the pixel signals $q_{A1}$, $q_{B1}$, equivalent to next one horizontal scanning line each, are transferred to the horizontal charge transfer paths HCCD1, HCCD2, respectively. The same operation as during times $T_{16}$ to $T_{17}$ is performed during times $T_{18}$ to $T_{19}$, thereby reading the pixel signals equivalent to the next horizontal scanning lines.

The foregoing describes the operation of reading the pixel signals for two horizontal scanning lines. The same operation as representatively described during times $T_6$ to $T_{17}$ is successively repeated until all the pixel signals $q_{A1}$, $q_{B1}$ corresponding to the first fields of the first and second frame regions are read at time $T_{20}$ in the figure.

Then, the operation of reading the pixel signals $q_{A2}$, $q_{B2}$ generated at the photodiodes A2, B2 corresponding to the second fields of the first and second frame regions is started. The timings for scanning the second fields are shown in FIG. 13. Upon completion of reading all the pixel signals of the first fields at time $T_{20}$ shown in FIG. 13, the pixel signals $q_{A2}$, $q_{B2}$ are transferred to the horizontal charge transfer paths HCCD1, HCCD2 for every horizontal scanning line in accordance with the changing logic level of each drive signal as shown during times $T_{21}$ to $T_{27}$. Specifically, during times $T_1$ to $T_6$ in FIGS. 12 and 15, the drive signals of times $T_{21}$ to $T_{26}$ shown in FIG. 13 cause not only the pixel signal $q_{A2}$ to be transferred to the transfer elements to which the pixel signal $q_{A1}$ have been transferred but also the pixel signal $q_{B2}$ to the transfer elements to which the pixel signal $q_{B1}$ have been transferred.

Figure 13:
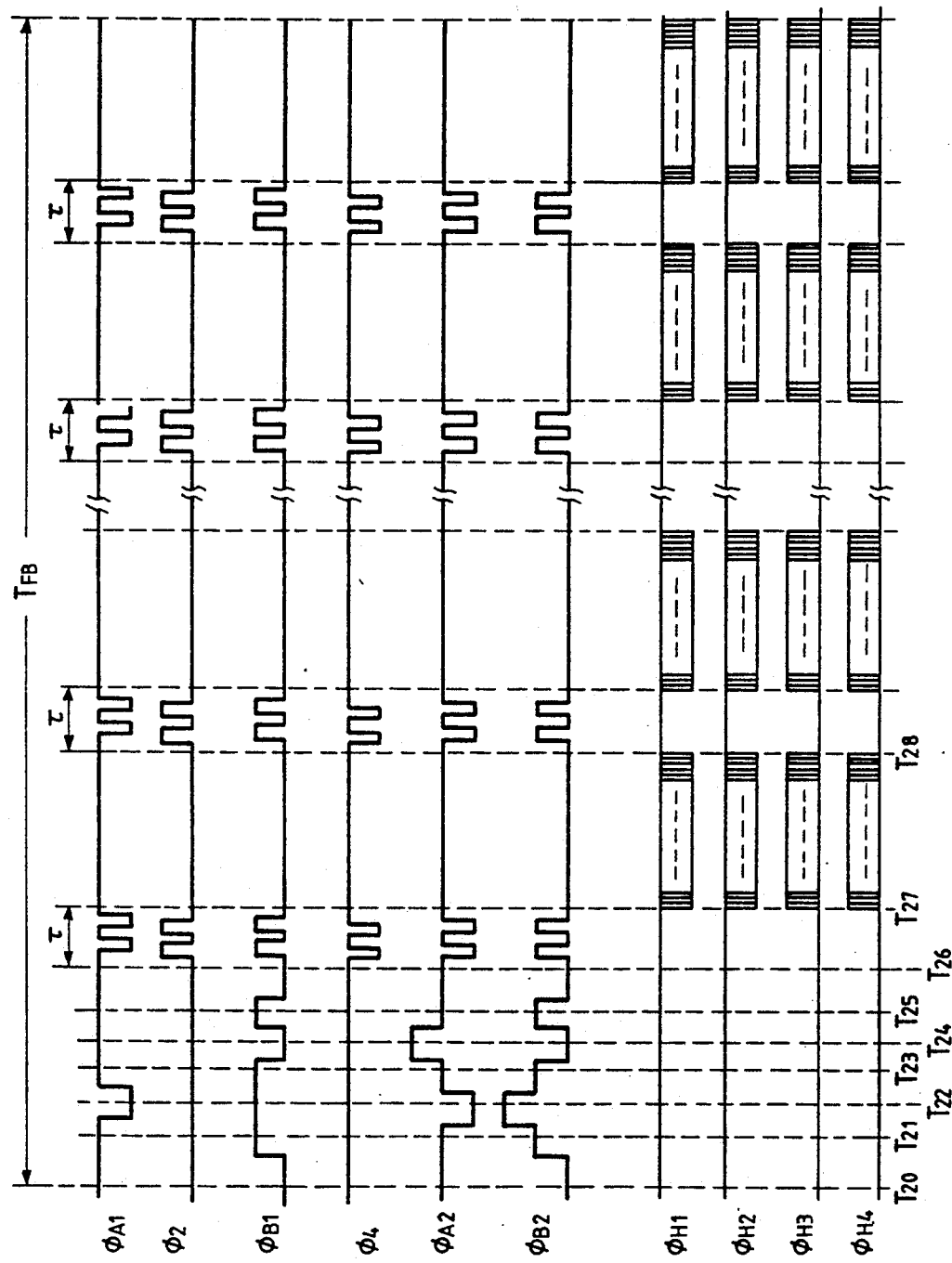

Then, during times $T_{26}$ to $T_{27}$ in FIG. 13, the pixel signals $q_{A2}$ to $q_{B2}$ are transferred to the horizontal charge transfer paths HCCD1, HCCD2 every scanning line at the timings similar to those shown in FIG. 14.

Then, during times $T_{27}$ to $T_{28}$ in FIG. 13, the pixel signals are transferred by the horizontal charge transfer paths HCCD1, HCCD2 at timings similar to those during times $T_{16}$ to $T_{17}$ in FIG. 12, thereby chronologically reading the pixel signals $q_{A2}$, $q_{B2}$ every one horizontal scanning line.

The same operation as representatively described during times $T_{26}$ to $T_{28}$ is repeated to the remaining pixel signals until all the pixel signals are read at time $T_{30}$.

As described above, according to the second embodiment, the number of pixels is increased in the vertical direction, thereby improving the vertical resolution. In addition, the photodiodes, each of which corresponds to a pixel, are divided into four fields and the pixel signals generated at these photodiodes are not only transferred every two fields in synchronism with the six-phase drive signals but also scanned and read through the two horizontal charge transfer paths. As a result, the scanning and reading operation can be performed at higher speeds than that of the first embodiment, making the device suitable for forming high-definition images in motion. Moreover, since only six-phase drive signals must be generated to perform the scanning and reading operation, the drive lines and drive circuits can be made simple.

While the horizontal charge transfer paths HCCD1, HCCD2 are operated by the four-phase drive signals in the second embodiment, their drive system is not limited thereto but may be two-phase drive system or other systems as well.

Figure 11:
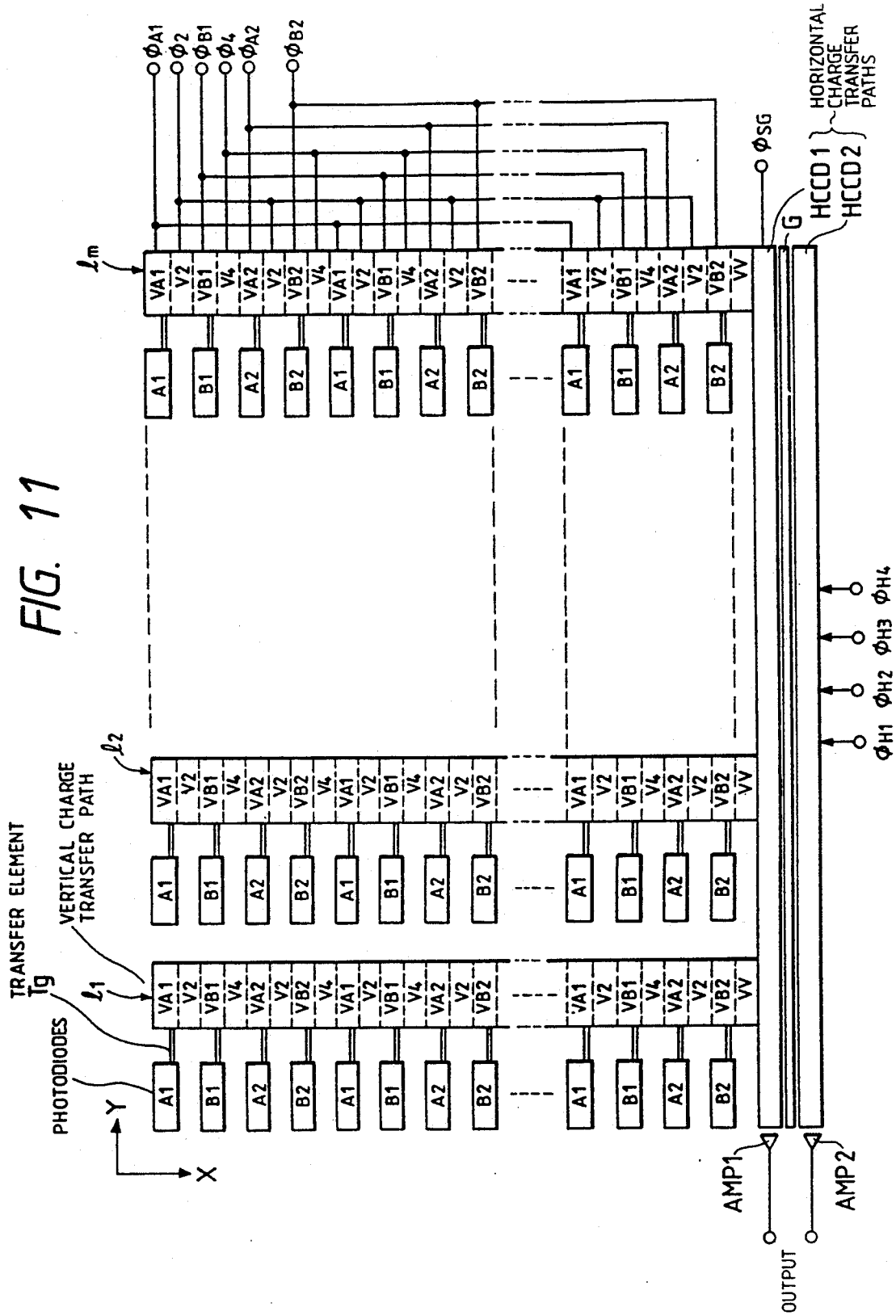
FIG. 11 is a diagram illustrating the construction of a solid-state imaging device according to a further embodiment of the present invention.

Moreover, it goes without saying that the second embodiment enables high-definition still pictures to be imaged. However, this embodiment, using two horizontal charge transfer paths HCCD1 and HCCD2, may in some cases cause flicker due to differences in transfer characteristics. In order to overcome this problem, the gate signal $\phi SG$ applied to the gate electrode G shown in FIG. 11 is always set to the "L" level and the drive timings described equivalent to the first embodiment are applied. As a result, the pixel signals can be read only by the first horizontal charge transfer path HCCD1, thereby preventing flicker It is defined in the first embodiment that the photodiodes A1, A2 are arranged in the first frame region and the photodiodes B1, B2, in the second frame region; and further that the photodiode A1 is arranged at the first field of the first frame region; the photodiode A2, at the second field of the first frame region; the photodiode B1, at the first field of the second frame region; and the photodiode B2, at the second field of the second frame region.

An embodiment of a still picture camera utilizing a solid-state imaging device of the present invention will be described with reference to FIG. 16. Reference numeral 1 designates a charge-coupled solid-state imaging device for receiving an optical image that has passed through an imaging optical system including an imaging lens, a diaphragm mechanism, and a shutter mechanism. Element 2 is a pre-processing circuit for amplifying a pixel signal outputted from the solid-state imaging device 1 by scanning and reading and for making adjustments such as $\gamma$ and white balance correction. Element 3 is an A/D converter for digitally converting a pixel signal outputted from the pre-processing circuit 2 into a pixel signal consisting of, e.g., 8 to 12 bits.

Figure 16:
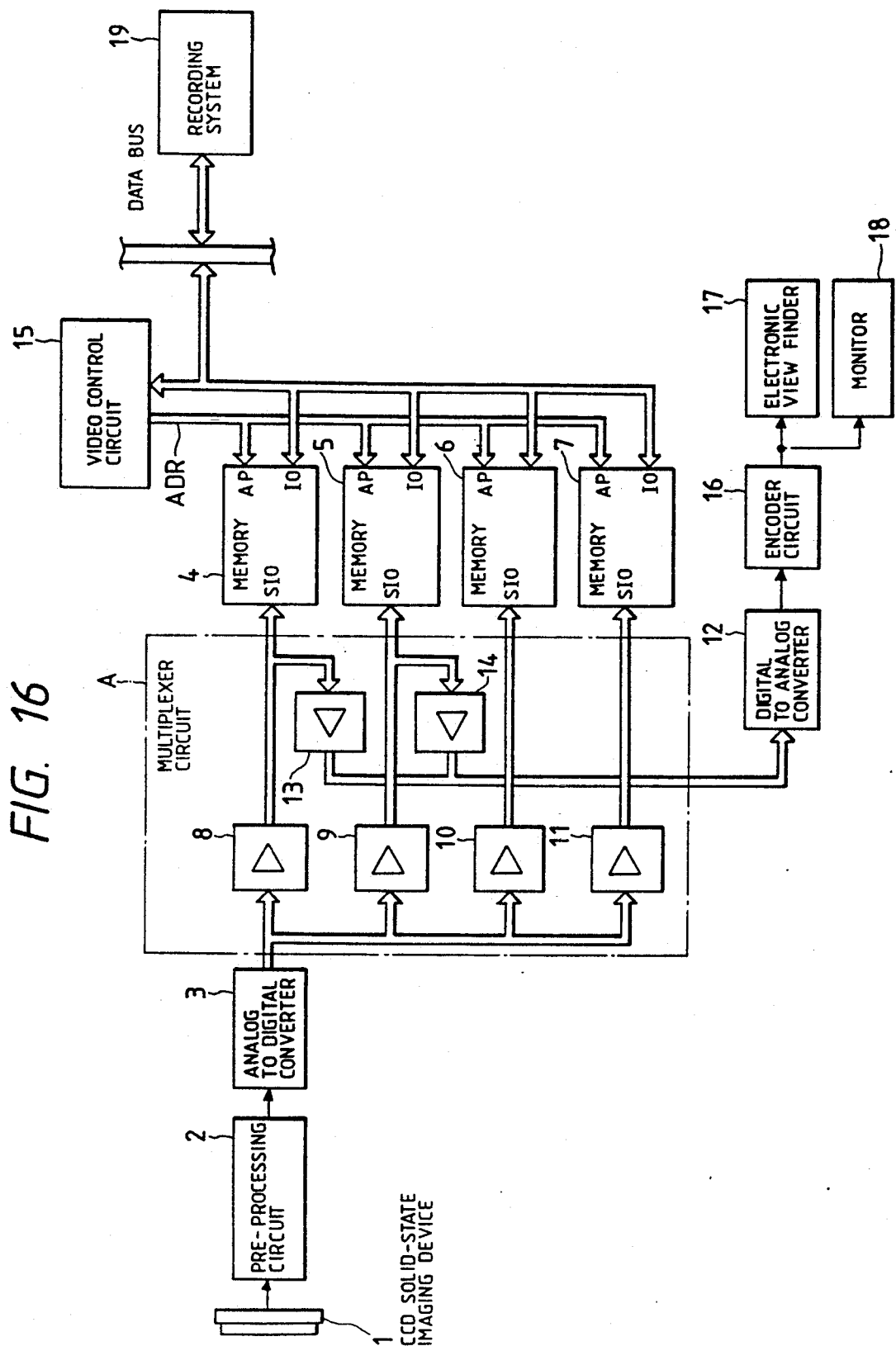
FIG. 16 is a diagram illustrative of the main portion of a still picture camera, which utilizes the solid-state imaging device illustrated in FIG. 1.

In FIG. 16, a portion A shown by the one-dot chain line is a multiplexer circuit that includes: a plurality of switches 8 to 11 for transferring pixel data outputted from the A/D converter 3 by distributing them to first through fourth memory regions 4-7 at a predetermined timing; and a plurality of switches 13, 14 for transferring the pixel data read from the first and second memory regions 4, 5 to a D/A converter 12 at a predetermined timing.

Reference numeral 15 designates a video control circuit which supplies an address signal ADR to the first through fourth memory regions 4-7 in synchronism with a read or write timing and which generates a control signal for controlling the switching operation of each analog switch 8-11, 13 and 14 within the multiplexer circuit A. The video control circuit 15 also generates horizontal and vertical synchronization signals which are supplied to an encoder circuit 16, which synchronization signals conform to the standard television systems such as the NTSC.

Reference numeral 16 designates the encoder circuit which forms a video signal consisting of a standard television system video signal, i.e., a color difference signal, a luminance signal, and a predetermined synchronization signal, out of an analog pixel signal outputted from the D/A converter. The encoder circuit 16 supplies the video signal to an electronic view finder 17 and an external monitor television system 18 through a predetermined external connection terminal (not shown).

Reference numeral 19 designates a recording system, which performs operations such as receiving the pixel data stored in the first through fourth memory regions 4-7 through a data bus, recording them in a magnetic recording medium, or causing them to be recorded in a semiconductor recording medium such as a so-called "memory card."

The multiplexer circuit A functions as follows. As shown in Table (1), the analog switches 8 to 11 conduct independently and exclusively during a predetermined period. Upon conduction of the analog switch 8, pixel data $D_{A1}$ scanned from the photodiode A1 corresponding to the first field of the first frame region is transferred to the first memory region 4. Upon conduction of the analog switch 9, pixel data $D_{A2}$ scanned from the photodiode A2 corresponding to the second field of the first frame region is transferred to the second memory region 5. Upon conduction of the analog switch 10, pixel data $D_{B1}$ scanned from the photodiode B1 corresponding to the first field of the second frame region is transferred to the third memory region 6. Finally, and upon conduction of the analog switch 11, pixel data $D_{B2}$ scanned from the photodiode B2 corresponding to the second field of the second frame region is transferred to the fourth memory region 7.

TABLE (1)

| | |
|---|---|
| A1 scanning period $T_{V1}$ | Analog switch 8 in conduction Other switches in non-conduction |
| A2 scanning period $T_{V2}$ | Analog switch 9 in conduction Other switches in non-conduction |
| B1 scanning period $T_{V3}$ | Analog switch 10 in conduction Other switches in non-conduction |
| B2 scanning period $T_{V4}$ | Analog switch 11 in conduction Other switches in non-conduction |

As shown in Table (2), the analog switches 13, 14 repeat conduction and non-conduction exclusively and alternately every period (1/60 second) equivalent to one field scanning period specified by the standard television systems such as the NTSC system. Specifically, upon conduction of the analog switch 13, the pixel data $D_{A1}$ read from the first memory region 4 is transferred to the D/A converter 12, and upon conduction of the analog switch 14, the pixel data $D_{A2}$ read from the second memory region 5 is transferred to the D/A converter 12.

TABLE (2)

| | |
|---|---|
| Reading period $T_{V1}$ or $T_{V3}$ from first memory region 4 | Analog switch 13 in conduction<br>Analog switch 14 in non-conduction |
| Reading period $T_{V2}$ or $T_{V4}$ from second memory region 5 | Analog switch 14 in conduction<br>Analog switch 13 in non-conduction |

Each of the first through fourth memory regions 4–7 are made of a dual port memory that includes: a serial input/output port SIO for sending and receiving the pixel data to and from the multiplexer circuit A; an address port AP for receiving the analog data ADR supplied from the video control circuit 15; and an input/output port IO for sending and receiving the pixel data to and from the data bus.

The operation of the system of FIG. 16 will be outlined with reference to FIG. 17. The solid-state imaging device 1, as illustrated in FIG. 1, performs the field scanning operation, as described with respect to FIG. 1 thereto, sequentially at each of scanning periods $T_{v1}$, $T_{V2}$, $T_{V3}$, $T_{V4}$ ($T_{V1}=T_{V2}=T_{V3}=T_{V4}=1/60$ second) to complete the reading operation of pixels corresponding to all the photodiodes within a four-field scanning period $T_{FL}$ (a period for scanning all the four fields) and this reading operation within the period $T_{FL}$ is repeated. Specifically, the photodiode A1 corresponding to the first field of the first frame region is scanned during times $t'_1$ to $t'_2$. Then the photodiode A2 corresponding to the second field of the first frame region is scanned during times $t'_3$ to $t'_4$. Then the photodiode B1 corresponding to the first field of the second frame region is scanned during times $t'_5$ to $t'_6$. Finally, the photodiode B2 corresponding to the second field of the second frame region is scanned during times $t'_7$ to $t'_8$. When the pixel signals equivalent to a frame of image has been read from such scanning operation within the four-field scanning period $T_{FL}$, the same operation is repeated. The initial period such as $t'_1$ to $t'_2$ or $t'_5$ to $t'_6$ is considered as a vertical blanking period.

The analog switches 8–11 of the multiplexer circuit A are switched into conduction as shown in Table (1) in synchronism with each field scanning timing, while as shown in FIG. 17 (b), the pixel data in each of the first through fourth memory regions 4–7 is sequentially stored in an address region corresponding to the address signal ADR from the video control circuit 15. The old pixel data in a memory region is updated by overwriting every four-field scanning period $T_{FL}$.

As shown in FIG. 17 (c), the scanning timing of the first and second memory regions 4, 5 is in synchronism with the switching operation of the analog switches 13, 14 shown in Table (2). The pixel data $D_{A2}$ in the second memory region 5 is read either at the period $T_{V1}$ for writing the pixel data $D_{A1}$ from the photodiode A1 into the first memory region 4 or at the period $T_{V3}$ for writing the pixel data $D_{B1}$ from the photodiode B1 into the third memory region 6. The pixel data $D_{A1}$ in the first memory region 4 is read either at the period $T_{V2}$ for writing the pixel data $D_{A2}$ from the photodiode A2 into the second memory region 5 or at the period $T_{V4}$ for writing the pixel data $D_{B2}$ from the photodiode B2 into the fourth memory region 7. The read pixel data is supplied to the encoder circuit 16 through the D/A converter 12, thereby causing the electronic view finder 17, or a monitor television 18, to generate a video signal for reproducing the image.

The operation during each of the field scanning period $T_{V1}$, $T_{V2}$, $T_{V3}$, $T_{V4}$ is as described in detail with reference to FIGS. 4–10. Accordingly, for the sake of brevity, the description will not be repeated.

In synchronism with storing the pixel data $D_{A1}$, $D_{A2}$, $D_{B1}$, $D_{B2}$ sequentially in the memory regions 4–7 during the field scanning periods $T_{V1}$, $T_{V2}$, $T_{V3}$, $T_{V4}$, respectively, the pixel data $D_{A1}$, $D_{A2}$ are read from the first and second memory regions 4, 5 alternately as shown in FIG. 17. As a result, a frame of image is reproduced every 1/30 second in the electronic view finder 17, allowing the image to be displayed in motion for picture angle adjustment.

Upon activation of the shutter by an operator, the shutter is closed and the four-field scanning period $T_{FL}$ operation is performed once during that shutter closing time, thereby discharging the unnecessary charges to the outside. After opening the shutter for a period set by a shutter speed, another round of four-field scanning period $T_{FL}$ operation is performed so that the pixel data equivalent to a frame of still picture are stored in the first through fourth memory regions 4–7 and the stored pixel data are then recorded in a recording medium by the recording system 19.

In addition, while pixel data scanned every field are being written into a predetermined memory region corresponding to each field, pixel data are read from another memory region to which no data is being written, reproducing the image in the electronic view finder based on this latter pixel data. Therefore, the image can be displayed in the electronic view finder as a motion picture Since the field scanning period is set to 1/60 second in this embodiment as described previously, the electronic view finder sequentially displays a frame of image every 1/30 second.

A further embodiment of the invention will now be described. The construction of the main portion of a still picture camera of the further embodiment of the invention will be described first with reference to FIG. 18. In FIG. 18, reference numeral 20 designates a charge-coupled solid-state imaging device, as illustrated specifically in FIG. 11, for receiving an optical image that has passed through an imaging optical system including an imaging lens, a diaphragm mechanism, and a shutter mechanism. As described previously with respect to FIGS. 11–15, the solid-state imaging device operates to output two kinds of pixel signals simultaneously from two horizontal charge transfer paths Reference numeral 21 designates a pre-processing circuit for amplifying a pixel signal outputted from one of the two horizontal charge transfer paths of the solid-state imaging device 20 and for making adjustments such as $\gamma$ and white balance correction. Element 22 represents a pre-processing circuit for performing the same operation for the other of the two horizontal charge transfer paths.

The pixel signal outputted from the pre-processing circuit 21 is digitally converted into pixel data consisting of, e.g., 8 to 12 bits by an A/D converter 23 and the converted pixel data is then stored in a first memory region 26 or a second memory region 27 by alternately switching analog switches 24, 25 into conduction at a predetermined timing. Similarly, the pixel signal outputted from the pre-processing circuit 22 is digitally converted into pixel data consisting of, e.g., 8 to 12 bits by an A/D converter 28 and the converted pixel data is then stored in a third memory region 31 or a fourth memory region 32 by alternately switching analog switches 29, 30 into conduction at a predetermined timing.

Reference numeral 34 designates a recording system which reads the pixel data stored in the first through fourth memory regions 26, 27, 31 and 32 through a data bus and records them onto a semiconductor recording medium such as a magnetic recording medium or a memory card.

Reference numeral 35 designates an encoder circuit which forms a video signal consisting of a standard television system video signal, i.e., a color difference signal, a luminance signal, and a predetermined synchronization signal, out of an analog pixel signal outputted from a D/A converter. The encoder circuit 35 supplies the video signal to an electronic view finder 36 and an external monitor television system 37 and the like through a predetermined external connection terminal (not shown).

Drive signals for driving the solid-state imaging device 20, signals for controlling the switching timing of the analog switches 24, 25, 29 and 30, control and address signals for writing to and reading from the memory regions 26, 27, 31 and 32, and other various synchronization signals for controlling the operation timing of the system are generated by a control signal generating circuit (not shown).

The A-field and B-field scanning operations, as shown and described with respect to FIGS. 12 and 13, are alternately repeated to display the reproduced image conforming to the NTSC system in the electronic view finder 36, allowing the optical image to be monitored as a motion picture.

Upon pressing the shutter, the shutter is closed and the A- and B-field scanning operation is performed once during that shutter closing time. As a result, the unnecessary charges are discharged to the outside. After opening the shutter for a period set by a shutter speed, another round of pixel signal scanning operation is performed once at the same timing as that shown in FIG. 12 or 14, thereby storing the pixel data equivalent to a frame of still picture.

During the A-field scanning period, the analog switches 24, 29 shown in FIG. 18 are switched to conduct and the analog switches 25, 30 in the same figure not to conduct. This causes the pixel signal qA, read from the photodiode A1 through the first horizontal charge transfer path HCCD1 to be stored in the first memory region 26 and also the pixel signal qB, read from the photodiode B1 through the second horizontal charge transfer path HCCD2 to be stored in the third memory region 31. On the other hand, during the B-field scanning period, the analog switches 25, 30 in FIG. 18 are switched to conduct and the analog switches 24, 29 not to conduct. This causes the pixel signal $q_{A2}$ read from the photodiode A2 through the first horizontal charge transfer path HCCD1 to be stored in the second memory region 27 and also the pixel signal $q_{B2}$ read from the photodiode B2 through the second horizontal charge transfer path HCCD2 to be stored in the fourth memory region 32.

After having stored all the pixel signals of both the A-fields and B-fields in the memory regions 26, 27, 31 and 32, these pixel signals are transferred to the recording system 34 through the data bus to be recorded on a semiconductor recording medium such as a magnetic recording medium or a memory card.

According to this embodiment, the number of pixels is increased in the vertical direction, thereby improving the vertical resolution. In addition, the photodiodes, each of which corresponds to a pixel, are divided into four fields and the pixel signals generated at these photodiodes are not only transferred every two fields in synchronism with the six-phase drive signals but also are scanned and read through the two horizontal charge transfer paths. As a result, the scanning operation can be performed at higher speeds than that of the first embodiment, making the device suitable for forming high definition images in motion.

In addition, since only six-phase drive signals that must be generated to perform the scanning and reading operation, the drive lines and drive circuits can be made simple.

Moreover, the ability of reproducing a frame of image every 1/60 second in the electronic view finder advantageously provides satisfactory monitoring.

As described in the foregoing, the invention can provide a highly operable high-definition still picture camera capable of reproducing an image as a motion picture and supplying low-scanning frequency pixel signals to the electronic view finder even when the solid-state imaging device includes a large number of pixels in the vertical direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A still picture camera comprising:
    solid-state imaging means for generating image signals of an image to be photographed including a plurality of columns of vertical repeating sequences of photoelectric conversion elements $A_1$, $B_1$, $A_2$ and $B_2$, coupled through transfer gates to respective vertical transfer lines which are equal in number to said plurality of columns, said vertical transfer lines coupled to a horizontal charge transfer line which transfers and outputs individual pixel signals as said image signals corresponding to said photoelectric conversion elements which have passed through said transfer gates and said vertical transfer lines, in accordance with drive signals;
    pre-processing means, coupled to said imaging means, for performing $\gamma$ and white balance correction operations and analog to digital conversion of said image signals to generate and output corrected image signals;
    memory means for separately storing in four different memory areas said corrected image signals corresponding to specific ones of said pixel signals of said photoelectric conversion elements $A_1$, $B_2$, $A_2$, and $B_2$ as separated image signals $A_1$, $B_1$, $A_2$ and $B_2$;

multiplexing means, coupled to said pre-processing means, for separating and outputting said corrected image signals as said separated image signals $A_1$, $B_1$, $A_2$ and $B_2$ to said memory means;

viewfinder means, coupled to said multiplexing means, for generating video signals in accordance with said separated image signals $A_1$ and $A_2$ and for displaying said image to be photographed as a motion picture in accordance with said generated video signals; and recording means, coupled to said memory means, for recording a still picture based upon said separated image signals $A_1$, $B_1$, $A_2$ and $B_2$ stored in said memory means under control of a video control circuit and in response to activation of a shutter release to record the still picture of the image displayed on said viewfinder means.

2. The still picture camera of claim 1, said viewfinder means further comprising a digital to analog converter for converting said separated image signals $A_1$ and $A_2$ into analog signals during generation of said video signals.

3. The still picture camera of claim 1, said photoelectric conversion elements $A_1$ and $A_2$ corresponding to first and second fields respectively of a first frame and said photoelectric conversion elements $B_1$ and $B_2$ corresponding to first and second fields respectively of a second frame.

4. A still picture camera operable in a high or low resolution mode comprising:

solid-state imaging means for generating image signals of an image to be photographed including a plurality of columns of vertical repeating sequences of photoelectric conversion elements $A_1$, $B_1$, $A_2$ and $B_2$, coupled through transfer gates to respective vertical transfer lines which are equal in number to said plurality of columns, said vertical transfer lines coupled to a horizontal charge transfer line comprised of first and second horizontal paths which transfer and output individual pixel signals as said image signals corresponding to said photoelectric conversion elements which have passed through said transfer gates and said vertical transfer lines, in accordance with drive signals, said photoelectric conversion elements $A_1$ and $A_2$ corresponding to first and second fields, respectively, of a first frame and said photoelectric conversion elements $B_1$ and $B_2$ corresponding to first and second fields, respectively of a second frame;

pre-processing means, coupled to said imaging means, for performing $\gamma$ and white balance correction operations of said image signals to generate and output corrected image signals;

memory means for separately storing in four different memory areas said corrected image signals corresponding to specific ones of said pixel signals of said photoelectric conversion elements $A_1$, $B_1$, $A_2$, and $B_2$ as separated image signals $A_1$, $B_1$, $A_2$ and $B_2$;

switching means, coupled to said pre-processing means, for separating and outputting said corrected image signals as said separated image signals $A_1$, $B_1$, $A_2$ and $B_2$ to said memory means;

viewfinder means, coupled to said pre-processing means, for generating video signals in accordance with said separated image signals $A_1$ and $A_2$ and for displaying said image to be photographed as a motion picture in accordance with said generated video signals; and recording means, coupled to said memory means, for recording a still picture based upon said separated image signals $A_1$, $B_1$, $A_2$ and $B_2$ stored in said memory means under control of a video control circuit and in response to activation of a shutter release to record a still picture of the image displayed on said viewfinder means, both of said first and second horizontal paths operable during the high resolution mode and only one of said first and second horizontal paths operable during the low resolution mode.

5. The still picture camera of claim 4, said first and second horizontal paths outputting separated image signals $A_1$ and $B_1$, respectively, during a first field scanning period and outputting separated image signals $A_2$ and $B_2$, respectively, during a second field scanning period.

6. The still picture camera of claim 5, said pre-processing means comprising a first processing circuit coupled to said first horizontal path for performing said correction operations on said separated image signals $A_1$ and $A_2$ and a second processing circuit coupled to said second horizontal path for performing said correction operations on said separated image signals $B_1$ and $B_2$.

* * * * *